US011313796B2

(12) United States Patent
Sakamoto et al.

(10) Patent No.: US 11,313,796 B2
(45) Date of Patent: Apr. 26, 2022

(54) OPTICAL WAVEGUIDE AND OPTICAL CONCENTRATION MEASURING APPARATUS COMPRISING A SUPPORT WITH A SHIFTED CONNECTING PORTION

(71) Applicant: Asahi Kasei Microdevices Corporation, Tokyo (JP)

(72) Inventors: Toshiro Sakamoto, Tokyo (JP); Tatsushi Yagi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 291 days.

(21) Appl. No.: 16/480,374

(22) PCT Filed: Feb. 19, 2018

(86) PCT No.: PCT/JP2018/005776
§ 371 (c)(1),
(2) Date: Jul. 24, 2019

(87) PCT Pub. No.: WO2018/163779
PCT Pub. Date: Sep. 13, 2018

(65) Prior Publication Data
US 2020/0158635 A1    May 21, 2020

(30) Foreign Application Priority Data

Mar. 6, 2017  (JP) ............................. JP2017-041799
Mar. 28, 2017 (JP) ............................. JP2017-063385
Nov. 29, 2017 (JP) ............................. JP2017-229493

(51) Int. Cl.
*G01N 21/35*       (2014.01)
*G01N 21/552*      (2014.01)
(Continued)

(52) U.S. Cl.
CPC ....... *G01N 21/552* (2013.01); *G01N 21/3504* (2013.01); *G01N 21/3577* (2013.01); *G02B 6/4215* (2013.01)

(58) Field of Classification Search
CPC .. G01N 21/3504; G01N 21/552; G01N 21/35; G02B 6/00; G02B 6/42
(Continued)

(56) References Cited

U.S. PATENT DOCUMENTS 7,528,403 B1    5/2009  Borselli et al.
10,928,318 B2   2/2021  Yagi et al.
(Continued)

FOREIGN PATENT DOCUMENTS

EP    0424703 A2    5/1991
EP    1918693 A1    5/2008
(Continued)

OTHER PUBLICATIONS

Begou, T. et al.,Marcatili's extended approach: comparison to semi-vectorial methods applied to pedestal waveguide design, Journal of Optics A: Pure and Applied Optics, May 2008, pp. 1-9, vol. 10, No. 5.
(Continued)

*Primary Examiner* — Que Tan Le
(74) *Attorney, Agent, or Firm* — Kenja IP Law PC

(57) ABSTRACT

An optical waveguide (10) includes a substrate (15), a core layer (11) that extends along the longitudinal direction and through which infrared light IR can propagate, and a support (17) formed from a material with a smaller refractive index than the core layer (11) and configured to connect at least a portion of the substrate (15) and at least a portion of the core layer (11) to support the core layer with respect to the substrate (15). A connecting portion (171) of the support (17) connected to the core layer (11) is shifted from the
(Continued)

position having the shortest distance from the center to the outer surface in a cross-section perpendicular to the longitudinal direction of the core layer (11).

16 Claims, 32 Drawing Sheets

(51) Int. Cl.
G01N 21/3504 (2014.01)
G01N 21/3577 (2014.01)
G02B 6/42 (2006.01)

(58) Field of Classification Search
USPC .................. 250/221, 222.2, 227.24, 227.25
See application file for complete search history.

(56) References Cited

U.S. PATENT DOCUMENTS

| | | | |
|---|---|---|---|
| 11,036,013 B2* | 6/2021 | Takahashi | G02B 6/12 |
| 2003/0109055 A1 | 6/2003 | Lehmann et al. | |
| 2005/0089261 A1 | 4/2005 | Shimazaki | |
| 2010/0307246 A1 | 12/2010 | Fujii et al. | |
| 2010/0307617 A1 | 12/2010 | Miura et al. | |
| 2011/0112769 A1 | 5/2011 | Niederberger et al. | |
| 2011/0268385 A1 | 11/2011 | Yamashita et al. | |
| 2014/0264030 A1 | 9/2014 | Lin et al. | |
| 2016/0284502 A1 | 9/2016 | Paoloni | |
| 2018/0070868 A1 | 3/2018 | Lin | |
| 2018/0164208 A1 | 6/2018 | Gylfason et al. | |
| 2019/0154570 A1 | 5/2019 | Gylfason et al. | |
| 2020/0158635 A1 | 5/2020 | Sakamoto et al. | |

FOREIGN PATENT DOCUMENTS

| | | |
|---|---|---|
| JP | H03122553 A | 5/1991 |
| JP | 2005077315 A | 3/2005 |
| JP | 2005134139 A | 5/2005 |
| JP | 2005300212 A | 10/2005 |
| JP | 2008116955 A | 5/2008 |
| JP | 2010014739 A | 1/2010 |
| JP | 2011017693 A | 1/2011 |
| JP | 2011521278 A | 7/2011 |
| JP | 2011232574 A | 11/2011 |
| JP | 2012135819 A | 7/2012 |
| JP | 2016185574 A | 10/2016 |
| JP | 2018521322 A | 8/2018 |
| WO | 2008111745 A1 | 9/2008 |
| WO | 2009096529 A1 | 8/2009 |
| WO | 2016086090 A1 | 6/2016 |
| WO | 2017003353 A1 | 1/2017 |
| WO | 2019177517 A1 | 9/2019 |

OTHER PUBLICATIONS

May 22, 2018, International Search Report issued in the International Patent Application No. PCT/JP2018/005776.

Pao Tai Lin et al., Si-CMOS compatible materials and devices for mid-IR microphotonics, Optical Materials Express, Sep. 1, 2013, pp. 1474-1487, vol. 3, No. 9.

Sep. 10, 2019, International Preliminary Report on Patentability issued in the International Patent Application No. PCT/JP2018/005776.

* cited by examiner

_US 11,313,796 B2_

OPTICAL WAVEGUIDE AND OPTICAL CONCENTRATION MEASURING APPARATUS COMPRISING A SUPPORT WITH A SHIFTED CONNECTING PORTION

CROSS-REFERENCE TO RELATED APPLICATION

The present application claims priority to and the benefit of Japanese Patent Application No. 2017-041799 filed Mar. 6, 2017, Japanese Patent Application No. 2017-063385 filed Mar. 28, 2017, and Japanese Patent Application No. 2017-229493 filed Nov. 29, 2017, the entire contents of which are incorporated herein by reference.

TECHNICAL FIELD

The present disclosure relates to an optical waveguide and an optical concentration measuring apparatus.

BACKGROUND

When the refractive index of a material forming a structure, such as a thin film formed by crystals or the like, is greater than the refractive index of material outside the structure, light propagating through the structure progresses while repeatedly undergoing total internal reflection at the boundary between the structure and the outside of the structure.

As illustrated in FIG. 35, when light L propagating through a structure 51 undergoes total internal reflection at the boundary between the structure 51 and a substance 53, the light L not only propagates inside the structure 51 but also extends into the substance 53 that has a small refractive index. This extension is referred to as an evanescent wave, which may be absorbed by the substance adjacent to the structure 51 while the light L propagates through the structure 51. In FIG. 35, the intensity of the light L propagating inside the structure 51 is indicated as light intensity E1, whereas the intensity of the evanescent wave is indicated as light intensity E2. Therefore, the substance 53 in contact with the structure 51 can be detected, identified, or the like from the change in intensity of the light L propagating through the structure 51. An analytical method using the above-described principle of evanescent waves is referred to as the attenuated total reflection (ATR) method and is used in the chemical composition analysis of substances, for example.

Patent literature (PTL) 1 proposes an optical waveguide sensor in which the ATR method is applied to a sensor. This optical waveguide sensor has a core layer formed on a substrate, allows light to pass through the core layer, and uses an evanescent wave to detect a substance in contact with the core layer.

The sensor sensitivity of a sensor using the ATR method can be improved by increasing the amount of interaction between the evanescent wave and the substance to be measured and by reducing the absorption of light by material other than the substance to be measured. Therefore, a pedestal structure (see FIG. 36), in which the layer below the core layer is minimized to leave a portion of the core layer floating, has been proposed in recent years, as in non-patent literature (NPL) 1.

Infrared light is typically used as the light propagated through the core layer. Substances have the property of selectively absorbing infrared light of particular wavelengths. A substance can therefore be analyzed or sensed by propagating infrared light in accordance with the absorption spectrum of the substance to be measured.

CITATION LIST

Patent Literature

PTL 1: JP2005-300212A

Non-patent Literature

NPL 1: Pao Tai Lin et al., "Si-CMOS compatible materials and devices for mid-IR microphotonics", Optical Materials Express, Vol. 3, Issue 9, pp. 1474-1487 (2013)

SUMMARY

Technical Problem

A sensor for detecting a substance to be measured, such as a gas or a liquid, is required to be capable of stably detecting the substance to be measured, in a variety of modes of use, with high sensitivity.

It is an objective of the present disclosure to provide an optical waveguide and an optical concentration measuring apparatus that can stably detect a substance to be measured, in a variety of modes of use, with high sensitivity.

Solution to Problem

To achieve the aforementioned objective, an optical waveguide according to an embodiment of the present disclosure is an optical waveguide for use in an optical concentration measuring apparatus for measuring concentration of a gas to be measured or a liquid to be measured, the optical waveguide including a substrate, a core layer that extends along a longitudinal direction and through which light can propagate, and a support formed from a material with a smaller refractive index than the core layer and configured to connect at least a portion of the substrate and at least a portion of the core layer to support the core layer with respect to the substrate. A connecting portion of the support connected to the core layer is shifted from a position having a shortest distance from a center to an outer surface in a cross-section perpendicular to the longitudinal direction of the core layer.

To achieve the aforementioned objective, an optical waveguide according to another embodiment of the present disclosure includes a substrate, a core layer that extends along a longitudinal direction and through which light can propagate, and a support formed from a material with a smaller refractive index than the core layer and configured to connect at least a portion of the substrate and at least a portion of the core layer to support the core layer with respect to the substrate. At least a portion of the core layer is provided in a manner allowing contact with a gas or a liquid. A connecting portion of the support connected to the core layer is shifted from a position having a shortest distance from a center to an outer surface in a cross-section perpendicular to the longitudinal direction of the core layer.

To achieve the aforementioned objective, an optical concentration measuring apparatus according to an embodiment of the present disclosure includes the optical waveguide according to any embodiment of the present disclosure, a light source capable of causing light to enter the core layer, and a detector capable of detecting light that has propagated through the core layer.

Advantageous Effect

The present disclosure can provide an optical waveguide and an optical concentration measuring apparatus that can stably detect a substance to be measured, in a variety of modes of use, with high sensitivity.

DETAILED DESCRIPTION

Figure 1:
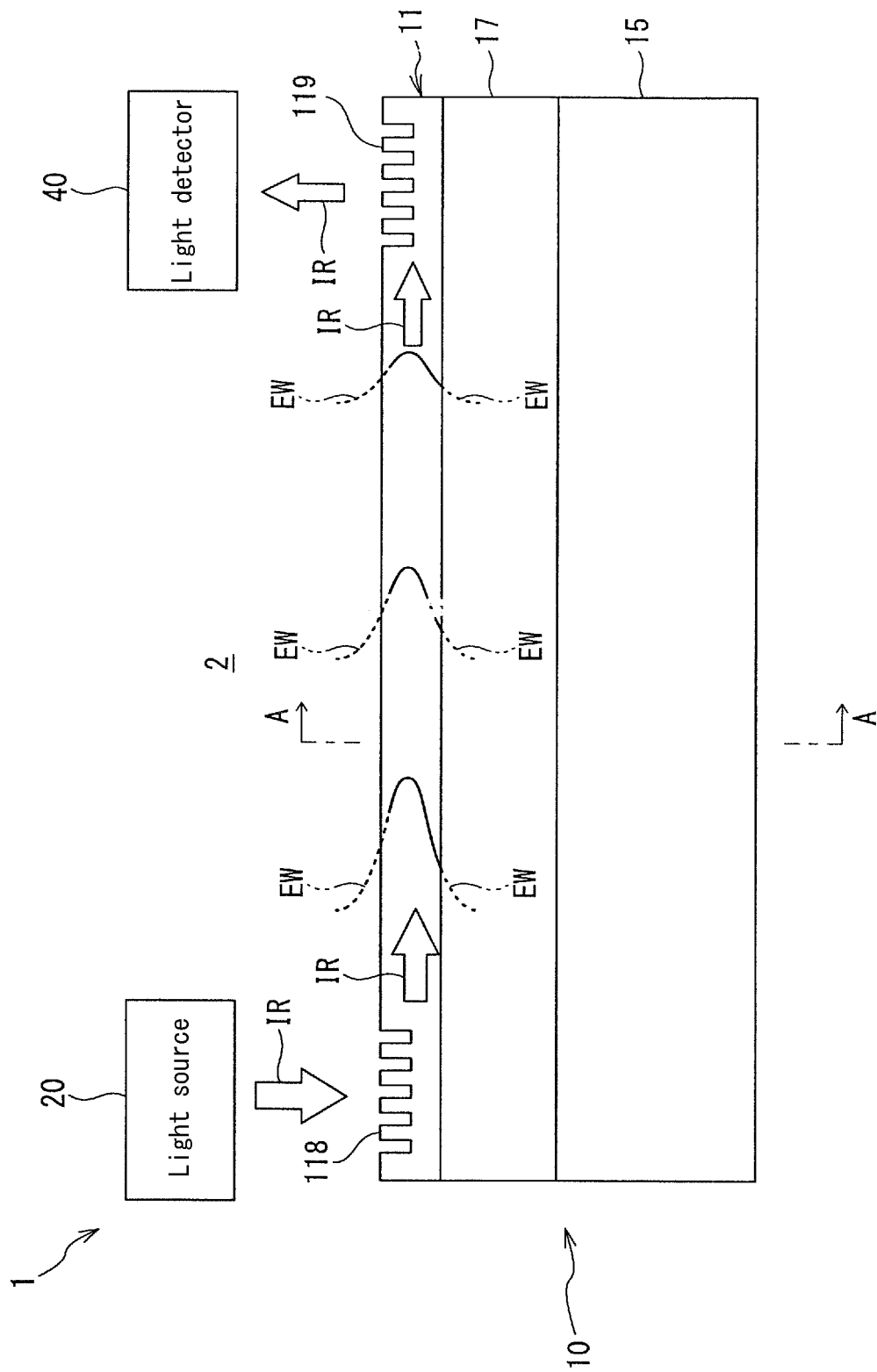
FIG. 1 illustrates the schematic configuration of an optical waveguide 10 and an optical concentration measuring apparatus 1 according to a first embodiment of the present disclosure and illustrates sensing by the ATR method using the optical concentration measuring apparatus 1.

Embodiments of the present disclosure are now described, but the following embodiments do not limit the claimed subject matter. Furthermore, not all combinations of features described in the embodiments are necessarily essential to the solution to the problem of the present disclosure.

<Optical Waveguide>

An optical waveguide according to a first embodiment of the present disclosure is an optical waveguide for use in an optical concentration measuring apparatus for measuring concentration of a gas to be measured or a liquid to be measured. The optical waveguide includes a substrate, a core layer that extends along a longitudinal direction and through which light can propagate, and a support formed from a material with a smaller refractive index than the core layer and configured to connect at least a portion of the substrate and at least a portion of the core layer to support the core layer with respect to the substrate. A connecting portion of the support connected to the core layer is shifted from a position having a shortest distance from a center to an outer surface in a cross-section perpendicular to the longitudinal direction of the core layer. The longitudinal direction is the direction of greatest extension in a three-dimensional structure that is elongated in at least one direction. The longitudinal direction may refer not only to a linear direction but also to a curved direction. The cross-section perpendicular to the longitudinal direction of the core layer may be, but is not limited to, a rectangle. The cross-section may have any shape that is not circular and for which the distance from the center of the cross-section to the outer surface varies with rotation about an axis at the center of the cross-section. The refractive index refers to the refractive index relative to light of any wavelength or light of a particular wavelength. Particularly in an optical concentration measuring apparatus, the light of a particular wavelength is the light propagating through the core layer. The width direction is a direction perpendicular to the longitudinal direction of the core layer and parallel to the principal surface of the substrate in the present embodiment. The principal surface of the substrate is a surface perpendicular to the thickness direction of the substrate and refers, in the present embodiment, to the surface with the greatest area among the six surfaces forming the substrate. At least a portion of the core layer may be provided in a manner allowing contact, via a film that is thinner than the wavelength of light propagating through the core layer, with the gas to be measured or the liquid to be measured.

The connecting portion of the support connected to the core layer in the optical waveguide according to the first embodiment is shifted from the position having the shortest distance from the center to the outer surface in a cross-section perpendicular to the longitudinal direction of the core layer. In other words, in a plane orthogonal to the longitudinal direction that becomes the direction along which light propagates, the connecting portion is provided at a position farther away than the position closest to the center through which light mainly propagates. Consequently, the optical waveguide according to the first embodiment can expand the region of interaction between an evanescent wave and the gas or liquid to be measured while decreasing absorption of the evanescent wave by the support. Therefore, the measurement sensitivity of an optical concentration measuring apparatus including the optical waveguide according to the first embodiment can be increased.

An optical waveguide according to a second embodiment of the present disclosure includes a substrate, a core layer that extends along a longitudinal direction and through which light can propagate, and a support formed from a material with a smaller refractive index than the core layer and configured to connect at least a portion of the substrate and at least a portion of the core layer to support the core layer with respect to the substrate. At least a portion of the core layer is provided in a manner allowing contact with a gas or a liquid. A connecting portion of the support connected to the core layer is shifted from a position having a shortest distance from a center to an outer surface in a cross-section perpendicular to the longitudinal direction of the core layer. The longitudinal direction is the direction of greatest extension in a three-dimensional structure that is elongated in at least one direction. The longitudinal direction may refer not only to a linear direction but also to a curved direction. The cross-section perpendicular to the longitudinal direction of the core layer may be, but is not limited to, a rectangle. The cross-section may have any shape that is not circular and for which the distance from the center of the cross-section to the outer surface varies with rotation about an axis at the center of the cross-section. The refractive index refers to the refractive index relative to light of any wavelength or light of a particular wavelength. Particularly in an optical concentration measuring apparatus, the light of a particular wavelength is the light propagating through the core layer. The width direction is a direction perpendicular to the longitudinal direction of the core layer and parallel to the principal surface of the substrate in the present embodiment. The principal surface of the substrate is a surface perpendicular to the thickness direction of the substrate and refers, in the present embodiment, to the surface with the greatest area among the six surfaces forming the substrate. At least a portion of the core layer may be provided in a manner allowing contact, via a film that is thinner than the wavelength of light propagating through the core layer, with the gas to be measured or the liquid to be measured.

The connecting portion of the support connected to the core layer in the optical waveguide according to the second embodiment is shifted from the position having the shortest distance from the center to the outer surface in a cross-section perpendicular to the longitudinal direction of the core layer. In other words, in a plane orthogonal to the longitudinal direction that becomes the direction along which light propagates, the connecting portion is provided at a position farther away than the position closest to the center through which light mainly propagates. Consequently, the optical waveguide according to the second embodiment can expand the region of interaction between an evanescent wave and the gas or liquid to be measured while decreasing absorption of the evanescent wave by the support. Therefore, the optical waveguide according to the second embodiment can increase the measurement sensitivity with respect to a gas or liquid around the core layer.

In the first embodiment and the second embodiment, the support may include a first support and a second support. Connecting portions of the first support and the second support connected to the core layer are shifted from the position having the shortest distance from the center to the outer surface in a cross-section perpendicular to the longitudinal direction of the core layer, and in a width direction of the core layer, a connecting portion of the first support is positioned between the center and one end, and a connecting portion of the second support is positioned between the center and the other end. The connecting portion of the first support and the connecting portion of the second support may be intermittently present along the longitudinal direction, or the connecting portion of the first support and the connecting portion of the second support may be alternately present along the longitudinal direction. At least a portion of the core layer may be exposed or covered by a thin film. In an optical concentration measuring apparatus, the thin film is thinner than the wavelength of light propagating through the core layer.

In the optical waveguide with this structure, the connecting portions of the first support and the second support connected to the core layer are shifted from the position having the shortest distance from the center to the outer surface in a cross-section perpendicular to the longitudinal direction of the core layer. In other words, in a plane that includes the support and is orthogonal to the longitudinal direction that becomes the direction along which light propagates, the connecting portions are provided at positions farther away than the position closest to the center through which light mainly propagates. Absorption of the evanescent wave by the first support and the second support can therefore be suppressed. At the same time, since the core layer includes a region connected to neither the first support nor the second support, the region of interaction between an evanescent wave and the gas or liquid to be measured can be expanded while the propagation loss of light for measurement is reduced. Furthermore, the core layer has good symmetry on a macro level as a result of the connecting portion of the first support being positioned between the center and one end, and the connecting portion of the second support being positioned between the center and the other end, in the width direction of the core layer. This can improve the mechanical strength of the core layer supported on the substrate. Therefore, the measurement sensitivity can be improved while maintaining high mechanical strength in an optical concentration measuring apparatus including the present optical waveguide. The connecting portion of the first support and the connecting portion of the second support are intermittently present along the longitudinal direction. In an optical waveguide configured so that the support is intermittently present, no predetermined layer is provided between the substrate and the core layer, except in a region necessary for supporting the core layer. In other words, a space is formed between the substrate and the core layer except in a region where the support is provided in an optical waveguide configured in this way. The region of interaction between the substance to be measured and the evanescent wave can thereby be expanded, and absorption of light L by the material provided on the substrate side of the core layer (for example, material configuring the support) can be reduced. In other words, more of the outer surface is not in contact with the first support or the second support in a portion of the core layer in the longitudinal direction, which further expands the region of interaction between the evanescent wave and the substance to be measured and further improves the sensitivity of a sensor using the optical waveguide. The connecting portion of the first support and the connecting portion of the second support are alternately present along the longitudinal direction. The optical waveguide therefore has even better symmetry with respect to the longitudinal direction, and the mechanical strength is further improved.

An optical waveguide according to a third embodiment of the present disclosure is an optical waveguide for use in an optical concentration measuring apparatus for measuring concentration of a gas to be measured or a liquid to be measured, the optical waveguide including a core layer, which extends along a longitudinal direction and through which light can propagate, and a protective film that is formed on at least a portion of a surface of the core layer, has a thickness of 1 nm or more and less than 20 nm, and has a smaller refractive index than the core layer. In a cross-section of at least a portion perpendicular to the longitudinal direction of the core layer, the entire surface of the core layer is not exposed. The longitudinal direction is the direction of greatest extension in a three-dimensional structure that is elongated in at least one direction. The longitudinal direction may refer not only to a linear direction but also to a curved direction. The width direction is a direction perpendicular to the longitudinal direction of the core layer and parallel to the principal surface of the substrate in the present embodiment. The principal surface of the substrate is a surface perpendicular to the thickness direction of the substrate and is the surface with the greatest area.

In a variety of modes of use of a sensor using the ATR method, a substance to be detected is detected sporadically or continually at certain intervals. Optical waveguides and optical concentration measuring apparatuses are therefore required to be capable of detecting a substance to be detected with high sensitivity while also preventing age-related degradation in sensitivity.

In the optical waveguide according to the third embodiment, a protective film with a smaller refractive index than the core layer is formed on at least a portion of the surface of the core layer, the protective film has a thickness of 1 nm or more and less than 20 nm, and in a cross-section perpendicular to the longitudinal direction of the core layer, the entire surface of the core layer is not exposed. This can prevent a change in the surface condition of the core layer without greatly decreasing the amount of interaction between the evanescent wave extending from the core layer and the gas or liquid to be measured. Consequently, a reduction in the detection sensitivity of the optical concentration measuring apparatus that includes the optical waveguide according to the third embodiment can be suppressed.

An optical waveguide according to a fourth embodiment of the present disclosure includes a core layer, which extends along a longitudinal direction and through which light can propagate, and a protective film that is formed on at least a portion of a surface of the core layer, has a thickness of 1 nm or more and less than 20 nm, and has a smaller refractive index than the core layer. At least a portion of the protective layer is provided in a manner allowing contact with a gas or a liquid. In a cross-section of at least a portion perpendicular to the longitudinal direction of the core layer, the entire surface of the core layer is not exposed.

In the optical waveguide according to the fourth embodiment, a protective film with a smaller refractive index than the core layer is formed on at least a portion of the surface of the core layer, the protective film has a thickness of 1 nm or more and less than 20 nm, and in a cross-section perpendicular to the longitudinal direction of the core layer, the entire surface of the core layer is not exposed. This can prevent a change in the surface condition of the core layer without greatly decreasing the amount of interaction between the evanescent wave extending from the core layer and the gas or liquid.

An optical waveguide according to a fifth embodiment of the present disclosure is an optical waveguide for use in an optical concentration measuring apparatus for measuring concentration of a gas to be measured or a liquid to be measured, the optical waveguide including a core layer, which extends along a longitudinal direction and through which light can propagate, and a protective film that is formed on at least a portion of a surface of the core layer, has a thickness less than the wavelength of light propagating through the core layer, includes nitrogen, and has a smaller refractive index than the core layer. In a cross-section of at least a portion perpendicular to the longitudinal direction of the core layer, the entire surface of the core layer is not exposed.

In the optical waveguide according to the fifth embodiment, a protective film including nitrogen and having a smaller refractive index than the core layer is formed on at least a portion of the surface of the core layer, and in a cross-section perpendicular to the longitudinal direction of the core layer, the entire surface of the core layer is not exposed. This can suppress oxidation of the core layer and prevent a change in the surface condition of the core layer. Consequently, a reduction in the detection sensitivity of the optical concentration measuring apparatus that includes the optical waveguide according to the fifth embodiment can be suppressed.

An optical waveguide according to a sixth embodiment of the present disclosure includes a core layer, which extends along a longitudinal direction and through which light can propagate, and a protective film that is formed on at least a portion of a surface of the core layer, has a thickness less than the wavelength of light propagating through the core layer, includes nitrogen, and has a smaller refractive index than the core layer. At least a portion of the protective layer is provided in a manner allowing contact with a gas or a liquid. In a cross-section of at least a portion perpendicular to the longitudinal direction of the core layer, the entire surface of the core layer is not exposed.

In the optical waveguide according to the sixth embodiment, a protective film including nitrogen and having a smaller refractive index than the core layer is formed on at least a portion of the surface of the core layer, and in a cross-section perpendicular to the longitudinal direction of the core layer, the entire surface of the core layer is not exposed. This can suppress oxidation of the core layer and prevent a change in the surface condition of the core layer.

The constituent elements of the optical waveguide are described below with examples.

<Core Layer>

The core layer may be any layer that extends in the longitudinal direction and through which light can propagate in the longitudinal direction. Specific examples include core layers made of silicon (Si) or gallium arsenide (GaAs). Furthermore, the effects of the third embodiment through the sixth embodiment are easier to achieve when the core layer is made of a material that does not include nitrogen. The longitudinal direction is the direction of greatest extension in a three-dimensional structure that is elongated in at least one direction. The longitudinal direction may refer not only to a linear direction but also to a curved direction. A vertical cross-section at any position along the longitudinal direction of the core layer is not circular but rather has any shape, such as a rectangle, for which the distance from the center of the cross-section to the outer surface varies with rotation about an axis at the center of the cross-section. Accordingly, the core layer has an elongated plate shape in the present embodiment.

At least a portion of the core layer may, for example, be exposed to allow direct contact with a gas to be measured or a liquid to be measured. At least a portion of the core layer may, for example, be coated with a thin film that is thinner than the wavelength of light propagating through the core layer to allow contact, via the thin film, with a gas to be measured or a liquid to be measured. This allows the evanescent wave to interact with the gas to be measured or the liquid to be measured to allow measurement of the concentration of the gas to be measured or the liquid to be measured.

The surface of the core layer need not include an exposed region in a vertical cross-section in the longitudinal direction of the core layer, which is the propagation direction of light. Due to natural oxidation, for example, the surface state of an exposed region worsens over time. Accordingly, in a cross-section perpendicular to the longitudinal direction of the core layer, a support and a protective film, described below, are preferably present without the surface of the core layer being exposed, or the protective film is preferably formed around the entire surface of the core layer.

At least a portion of the core layer may be floating, without being joined to the below-described support. This allows an increase in the amount of interaction between the evanescent wave extending from the core layer and the surrounding gas or liquid.

The below-described support need not be present in the entire region between the core layer and the substrate in a cross-section perpendicular to the longitudinal direction in at least a portion in the longitudinal direction of the core layer. This allows an increase in the amount of interaction between the evanescent wave extending out from the core layer and the surrounding gas or liquid. Stating that the support is not present refers to the core layer forming a bridge between two supports that are adjacent in the longitudinal direction. Furthermore, stating that the support is not present refers to how the entire region between the core layer and the substrate includes a space, or a medium that has a lower absorption of light propagating through the core layer than the support does, between two supports that are adjacent in the longitudinal direction.

The light propagating through the core layer may be infrared light serving as an analog signal. Infrared light serving as an analog signal does not refer to determining the change in the energy of light to be one of two values, i.e. 0 (low level) or 1 (high level), but rather to a signal that carries the amount of change in the energy of light. The optical waveguide according to each embodiment can therefore be applied to sensors or to analysis apparatuses. In this case, the wavelength of the infrared light may be from 2 μm or more to 10 μm or less. This is a wavelength at which representative gasses that float in the environment ($CO_2$, CO, NO, $N_2O$, $SO_2$, $CH_4$, $H_2O$, and the like) are absorbed. Consequently, the optical waveguide according to each embodiment can be used as a gas sensor.

<Substrate>

The substrate of the optical waveguide according to the first embodiment and the second embodiment may be any substrate on which the support and the core layer can be formed. The optical waveguide according to the third embodiment through the sixth embodiment may further include a substrate. The substrate of the optical waveguide according to the third embodiment through the sixth embodiment may be any substrate on which the core layer can be formed. Specific examples include a silicon substrate and a GaAs substrate. The principal surface of the substrate indicates the surface in a horizontal direction (a direction perpendicular to the film thickness direction) of the substrate.

<Support>

The support of the optical waveguide according to the first embodiment and the second embodiment connects at least a portion of the substrate with at least a portion of the core layer. The optical waveguide according to the third embodiment through the sixth embodiment may further include a support. The support of the optical waveguide according to the third embodiment through the sixth embodiment may be any support capable of joining the substrate and the core layer. The support supports the core layer with respect to the substrate. The support may be any material that has a smaller refractive index than the core layer, with respect to light of any wavelength or light propagating through the core layer, and that is capable of joining the substrate and the core layer. Examples of the material forming the support include $SiO_2$. The connecting portion of the support connected to the core layer is shifted from the position having the shortest distance from the center to the outer surface in a cross-section perpendicular to the longitudinal direction of the core layer (in the present embodiment, the central position in the width direction of the core layer, which has a rectangular cross-section). The support may be structured to be discontinuous. In other words, the optical waveguide may include a floating core layer having a region in which the support is not present.

The support may include a first support and a second support. The connecting portion of the first support to the core layer is positioned between the center and one end in the width direction of the core layer, and the connecting portion of the second support to the core layer is positioned between the center and the other end in the width direction of the core layer. The connecting portions of the first support and the second support may be intermittently present along the longitudinal direction of the core layer. The connecting portions of the first support and the second support may be alternately present along the longitudinal direction of the core layer. The connecting portions of the first support and the second support may be shaped to expand in the longitudinal direction of the core layer with proximity to the center of the core layer from an edge of the core layer in the width direction of the core layer. With this shape, the conditions around the core layer change gradually along the longitudinal direction of the core layer from a region without the first support or the second support to an area with the first support or the second support (or vice versa). A sudden change in the surrounding conditions for the light propagating through the core layer can therefore be suppressed, thus allowing a reduction in the scattering loss of light propagating through the core layer.

An example of a method of forming the support is to etch a buried oxide (BOX) layer (SiO2 layer) of a silicon on insulator (SOI) substrate, thereby forming a structure in which the BOX layer supports the core layer (Si layer) with respect to the substrate (Si layer).

The core layer may be divided into a plurality of portions. In this case, the connecting portion of the support may include a plurality of spatially separated connecting portions. One connecting portion among the plurality of connecting portions may be connected to one portion among the plurality of portions of the divided core layer, and another connecting portion among the plurality of connecting portions may be connected to another portion among the plurality of portions of the divided core layer. A plurality of core layers may be provided. In this case, one connecting portion among the plurality of connecting portions may be connected to one core layer among the plurality of core layers, and another connecting portion among the plurality of connecting portions may be connected to another core layer among the plurality of core layers.

A plurality of supports may be provided. At least one support among the plurality of supports may include a plurality of spatially separated connecting portions, as described above. This configuration, with one support connected to a plurality of portions of a core layer or a plurality of core layers, allows the support to be formed efficiently over a small area.

<Protective Film>

The core layer in an optical waveguide according to the first embodiment and the second embodiment may further include a protective film that is formed on at least a portion of the surface of the core layer and either has a film thickness of 1 nm or more and less than 20 nm or has a smaller refractive index than the core layer. The protective layer of the optical waveguide according to the third embodiment through the sixth embodiment may be any protective layer that can be formed on the core layer and that has a smaller refractive index than the core layer. The protective layer according to the third embodiment through the sixth embodiment may have a film thickness of 1 nm or more and less than 20 nm. Specific examples include a protective film formed by a silicon nitride film or a silicon oxynitride film. The protective film may be a single-layer film or a multilayer film. This can prevent a change in the surface condition of the core layer without greatly decreasing the amount of interaction between the evanescent wave extending from the core layer and the gas or liquid surrounding the core layer.

A thickness of 1 nm or more for the protective film can suppress the formation of a natural oxide film on the surface of the core layer. A thickness of less than 20 nm for the protective film does not greatly decrease the amount of interaction between the evanescent wave extending from the core layer and the gas or liquid surrounding the core layer. The lower limit on the thickness of the protective film may be 2 nm, and the upper limit on the thickness of the protective film may be 5 nm.

The protective film may include nitrogen. This allows further suppression of oxidation of the core layer. The film including nitrogen may be a single-layer film or may be a laminate of a film including nitrogen and a film not including nitrogen. The effect of deterring oxidation increases as the nitrogen content of the protective film is higher. The protective film may be a film that includes nitrogen and has a nitrogen content of 1% or more in at least a partial region of the film.

For example, when the core layer is formed from silicon, the material of the protective film may be a silicon nitride film, a silicon oxide film, or a silicon oxynitride film. A film including nitrogen has the effect of suppressing oxidation. A silicon nitride film, a silicon oxide film, and a silicon oxynitride film have a sufficiently smaller refractive index than silicon and are therefore excellent materials for forming a cladding layer. In particular, a silicon nitride film and a silicon oxynitride film exhibit little absorption of infrared light. Therefore, formation of a protective film on the surface of the core layer can suppress a reduction in the detection sensitivity of the gas to be measured or the liquid to be measured.

Here, when a substance such as silicon is released in the air, a silicon oxide film may form naturally on the surface. This natural oxide film is less than 1 nm thick and does not include nitrogen. Hence, the natural oxide film is distinguished from the protective film in the present disclosure with regard to these points.

At least a portion of the protective film may be provided in a manner allowing contact with the gas or liquid of which the concentration is to be measured by the optical concentration measuring apparatus. This can increase the amount of interaction between the evanescent wave extending from the core layer and the gas to be measured or liquid to be measured as compared to when at least a portion of the protective film is not in contact with the gas to be measured or the liquid to be measured. In other words, when at least a portion of the protective film is provided in a manner allowing contact with the gas to be measured or the liquid to be measured, a decrease in the amount of interaction between the evanescent wave extending from the core layer and the gas to be measured or liquid to be measured can be prevented.

The protective film may be formed around the entire surface of at least a portion of the core layer in a cross-section perpendicular to the longitudinal direction of the core layer, i.e. perpendicular to the propagation direction of light. In an optical waveguide having a floating core layer including the region with no support present, deterioration of the core layer can effectively be suppressed by forming the protective film around the entire surface of the floating core layer.

Methods such as deposition by thermal chemical vapor deposition (CVD) or oxidation can be used as the method of forming the protective film. The protective film can be formed by deposition using thermal CVD in the case of a silicon nitride film and can be formed by oxidation under an atmosphere including NO or $N_2O$ in the case of a silicon oxynitride film. The protective film can be formed around the entire surface of the core layer by thermal CVD or oxidation.

<Optical Concentration Measuring Apparatus>

An optical concentration measuring apparatus according to embodiments of the present disclosure includes the optical waveguide according to embodiments of the present disclosure, a light source capable of causing light to enter the core layer, and a detector capable of detecting light that has propagated through the core layer.

The constituent elements of the optical concentration measuring apparatus are described below with examples.

<Light Source>

The light source may be any light source capable of causing light to enter the core layer. An incandescent bulb, a ceramic heater, a micro electro mechanical systems (MEMS) heater, an infrared light emitting diode (LED), or the like can be used as the light source in the case of using infrared light to measure a gas. A mercury lamp, an ultraviolet LED, or the like can be used as the light source in the case of using ultraviolet rays to measure a gas. An electron beam, an electron laser, or the like can be used as the light source in the case of using x-rays to measure a gas.

The light propagating through the core layer of the optical waveguide provided in the optical concentration measuring apparatus may be infrared light serving as an analog signal. Infrared light serving as an analog signal does not refer to determining the change in the energy of light to be one of two values, i.e. 0 (low level) or 1 (high level), but rather to a signal that carries the amount of change in the energy of light. The optical concentration measuring apparatus can therefore be applied to sensors or to analysis apparatuses. In this case, the wavelength of the infrared light may be from 2 μm or more to 10 μm or less. This is a wavelength at which representative gasses that float in the environment ($CO_2$, CO, NO, $N_2O$, $SO_2$, $CH_4$, $H_2O$, and the like) are absorbed. Consequently, the optical concentration measuring apparatus of the present embodiment can be used as a gas sensor.

<Detector>

The detector may be any detector capable of detecting light that has propagated through the core layer of the optical waveguide. A thermal infrared sensor such as a pyroelectric sensor, a thermopile, or a bolometer; a quantum infrared sensor such as a diode or a phototransistor; or the like can be used as the detector in the case of using infrared light to measure a gas. A quantum ultraviolet sensor, such as a diode or a phototransistor, or the like can be used in the case of using ultraviolet rays to measure a gas. Various semiconductor sensors can be used as the detector in the case of using x-rays to measure a gas.

FIRST EMBODIMENT

An optical waveguide and an optical concentration measuring apparatus according to the first embodiment of the present disclosure are described with reference to FIG. 1 through FIG. 6.

Figure 2:
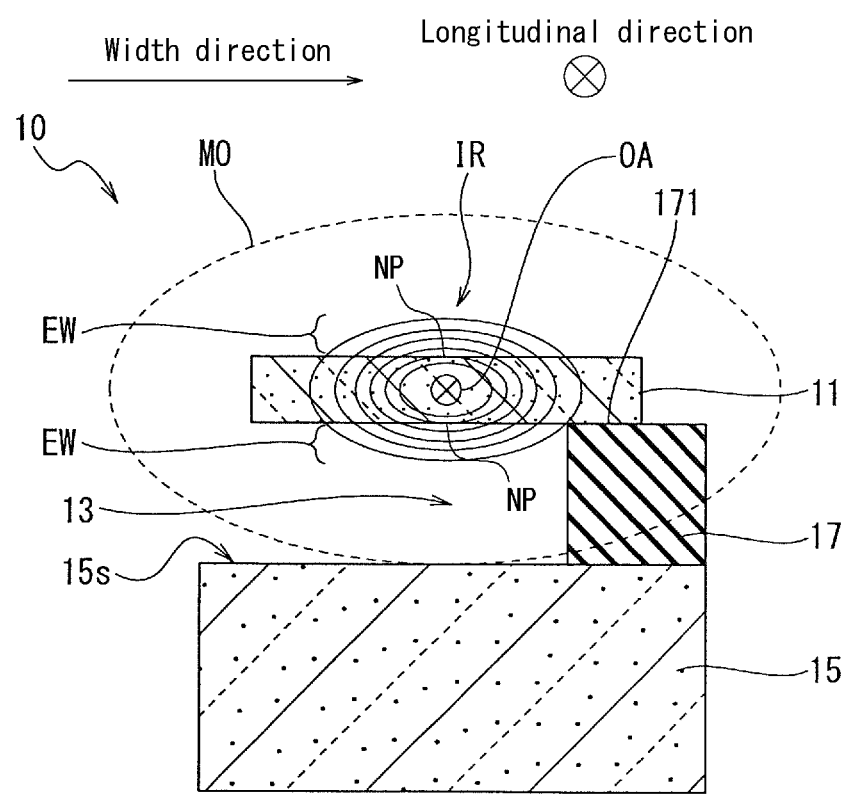
FIG. 2 is a cross-sectional end view of the optical waveguide 10 and the optical concentration measuring apparatus 1, along the A-A line in FIG. 1, illustrating the schematic configuration of the optical waveguide 10 and the optical concentration measuring apparatus 1 according to the first embodiment of the present disclosure.

FIG. 1 and FIG. 2 illustrate the schematic configuration of an optical concentration measuring apparatus 1 according to the first embodiment and are also conceptual drawings of the ATR method using the optical waveguide 10 according to the first embodiment.

As illustrated in FIG. 1, the optical concentration measuring apparatus 1 is installed and used in an exterior space 2 containing a gas whose concentration or the like is to be detected. The optical concentration measuring apparatus 1 includes the optical waveguide 10 according to the first embodiment, a light source 20 capable of causing light (infrared light IR in the first embodiment) to enter a core layer 11 provided in the optical waveguide 10, and a light detector (an example of a detector) 40 capable of detecting the infrared light IR that has propagated through the core layer 11.

The optical waveguide 10 includes a substrate 15, the core layer 11 through which the infrared light IR (an example of light) can propagate, and a support 17 configured to connect at least a portion of the substrate 15 with at least a portion of the core layer 11 and support the core layer 11 with respect to the substrate 15. The core layer 11 and the substrate 15 are formed from silicon (Si), and the support 17 is formed from silicon dioxide ($SiO_2$).

The substrate 15 is plate-shaped, for example. The core layer 11 is a rectangular parallelepiped, for example. The optical waveguide 10 includes a grating coupler 118 formed at one end of the core layer 11 in the longitudinal direction and a grating coupler 119 formed at the other end of the core layer 11 in the longitudinal direction (the left-right direction in FIG. 1). The grating coupler 118 is disposed in the emission direction of the light source 20 (in the first embodiment, vertically downward in a state such that the stacking direction of the optical waveguide 10 is parallel to the vertical direction and the substrate 15 is disposed to face vertically downward). The grating coupler 118 couples the infrared light IR incident from the light source 20 with the infrared light IR propagating through the core layer 11. The grating coupler 119 is disposed in a direction facing the light detector 40 (in the first embodiment, vertically downward in a state such that the stacking direction of the optical waveguide 10 is parallel to the vertical direction and the substrate 15 is disposed to face vertically downward). The grating coupler 119 extracts the infrared light IR propagating through the core layer 11 and emits the infrared light IR towards the light detector 40.

As illustrated in FIG. 2, the optical waveguide 10 is structured to include a space 13 below the core layer 11, without including a predetermined layer such as a cladding layer, except in a region where the support 17 is provided. A connecting portion 171 of the support 17 connected to the core layer 11 is shifted from the position NP having the shortest distance from the center to the outer surface in a cross-section perpendicular to the longitudinal direction of the core layer 11 (in the first embodiment, the central position in the width direction of the cross-section). In other words, the connecting portion 171 of the support 17 is positioned towards one end (the right end in FIG. 2) from the center of the core layer 11 in the width direction (the left-right direction in FIG. 2).

Figure 36:
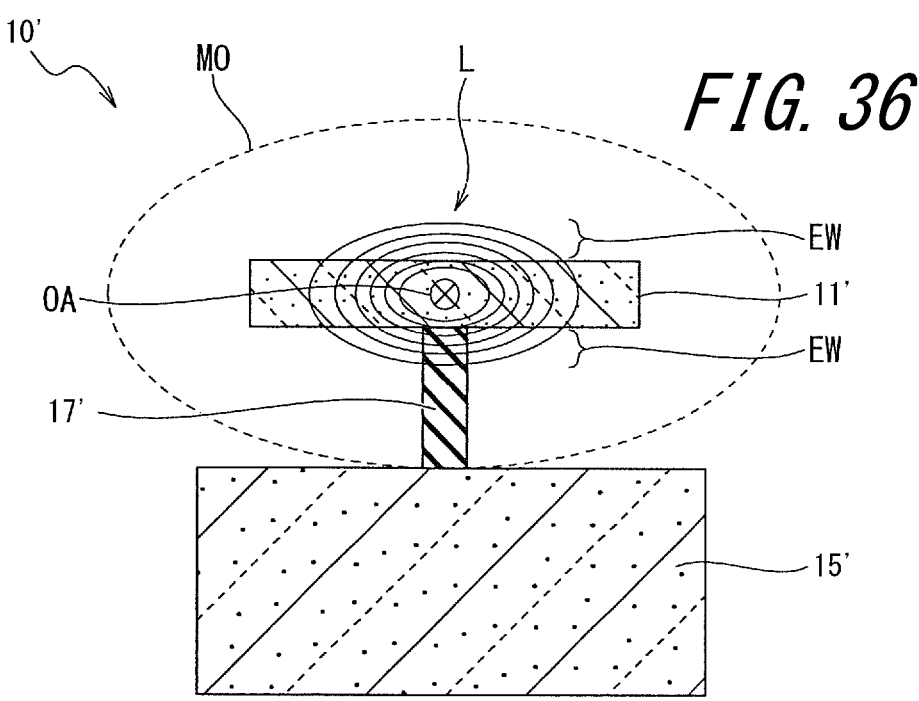
FIG. 36 is a cross-sectional view of single-mode propagation of light L through a core layer 17' of an optical waveguide 10' that has a conventional pedestal structure.

Here, the effects of the optical waveguide 10 according to the first embodiment are described by comparison with an optical waveguide 10' that has the conventional pedestal structure illustrated in FIG. 36.

A sensor using the ATR method often uses single-mode propagation of light inside the core layer. In the optical concentration measuring apparatus 1 according to the first embodiment as well, light (infrared light) propagates in single-mode inside the core layer 11 provided in the optical waveguide 10. In the case of multi-mode propagation as well, however, the effects of the present disclosure are obtained, since a light component propagating through the center of the core layer 11 is present. As illustrated in FIG. 2, when infrared light IR propagates through the core layer 11 in single-mode, the optical axis OA of the infrared light IR is positioned nearly at the center of the core layer 11 in a cross-section along a plane orthogonal to the longitudinal direction, which is the propagation direction of the infrared light IR. At this time, an evanescent wave EW extending around the core layer 11 increases near the surface of the core layer 11 close to the optical axis OA, reaching a maximum near the outer surface where the distance from the center of the core layer 11, which overlaps with the optical axis OA, is shortest. In FIG. 36, the distribution of the evanescent wave EW of the infrared light IR propagating through the core layer 11' of the optical waveguide 10' with a conventional structure is similar to that of the optical waveguide 10 of the first embodiment.

In a sensor using the ATR method, the sensitivity of the sensor is raised by expanding the region of interaction between the evanescent wave extending from the core layer and the substance to be measured and decreasing the absorption of light by material other than the substance to be measured (i.e., absorption of light by the support or the like). In the structure illustrated in FIG. 36, however, the connecting portion connecting the core layer and the support for supporting the core layer is positioned near the outer surface where the distance from the center of the core layer is shortest in a cross-section along a plane orthogonal to the propagation direction of light through the core layer. The support therefore ends up overlapping with the area of the outer surface where the distance from the optical axis of light undergoing single-mode propagation is shortest. The evanescent wave extending around the core layer is greatest by the surface near the optical axis. Hence, if the support is near this outer surface, much of the evanescent wave is absorbed by the material forming the support. A sensor using an optical waveguide with such a structure thus has the problem of decreased detection sensitivity of the substance to be measured.

This problem with a conventional optical waveguide is now described with reference to FIG. 36. As illustrated in FIG. 36, the support 17' in the optical waveguide 10' with a conventional pedestal structure is provided between the center of the core layer 11' and the substrate 15' within a plane (i.e. the cross-section illustrated in FIG. 36) orthogonal to the longitudinal direction, which is the propagation direction of light L. When the connecting portion connecting the core layer 11' and the support 17' for supporting the core layer 11' is thus positioned at the widthwise center of the core layer 11' in a cross-section along a plane orthogonal to the propagation direction of light L, the evanescent wave EW may be absorbed by the material forming the support 17', and the region of the support 17' may become an obstacle that reduces the region of interaction between the evanescent wave EW and the substance to be measured. Consequently, the sensitivity of a sensor using the optical waveguide 10' decreases.

As illustrated in FIG. 2, the optical waveguide 10 according to the first embodiment is structured so that the core layer 11 is supported by the support 17 with respect to the substrate 15 while the space 13 is formed between the core layer 11 and the substrate 15, like the conventional optical waveguide 10'. The core layer 11 has a symmetrical structure about the center in a cross-section perpendicular to the longitudinal direction. When the propagation of the infrared light IR through the core layer 11 is single-mode, the optical axis OA of the infrared light IR propagating through the core layer 11 is in the center of the core layer 11. As illustrated in FIG. 2, the support 17 is therefore shifted to one side from the widthwise center of the core layer 11 (to the right in FIG. 2). The support 17 can thereby be removed from the region where the evanescent wave EW is most concentrated. In other words, the connecting portion 171 of the support 17 connecting to the core layer 11 is not at the position, near the outer surface, with the shortest distance from the center of the core layer 11 in a cross-section perpendicular to the longitudinal direction. The optical waveguide 10 thus becomes an optical waveguide that passes an analog signal through the core layer 11 that is partially floating. Accordingly, the optical concentration measuring apparatus 1 that includes the optical waveguide 10 can prevent a decrease, due to the presence of the support 17, in the detection characteristics of the substance to be measured insofar as possible.

Figure 3A:
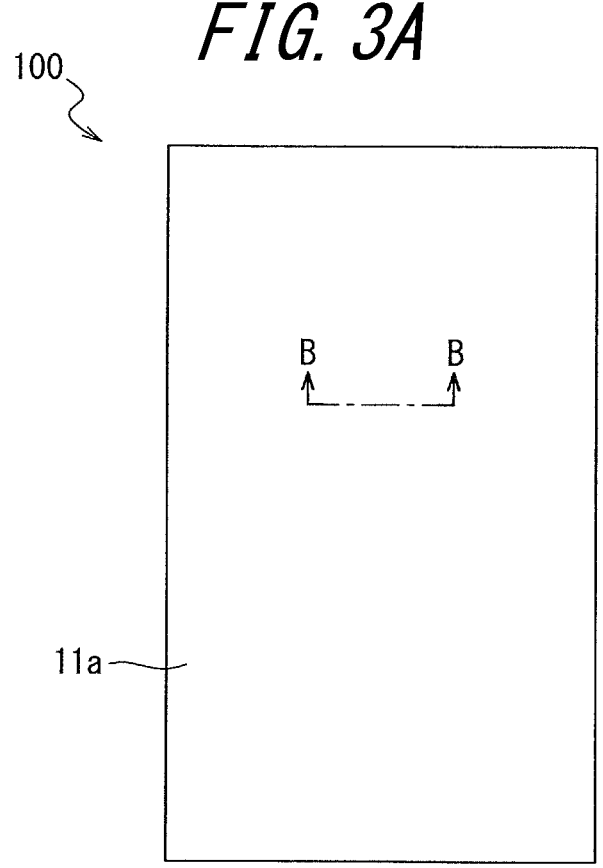
FIG. 3A is a manufacturing process plan view (part 1) of the optical waveguide 10 to illustrate a method of manufacturing the optical waveguide 10 according to the first embodiment of the present disclosure.
Figure 3B:
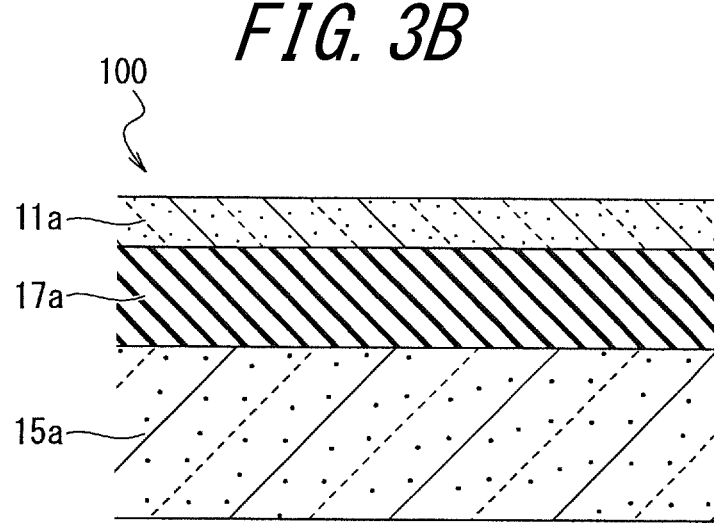
FIG. 3B is a cross-sectional manufacturing process end view (part 1) of the optical waveguide 10, along the B-B line in FIG. 3A, to illustrate the method of manufacturing the optical waveguide 10 according to the first embodiment of the present disclosure.
Figure 4A:
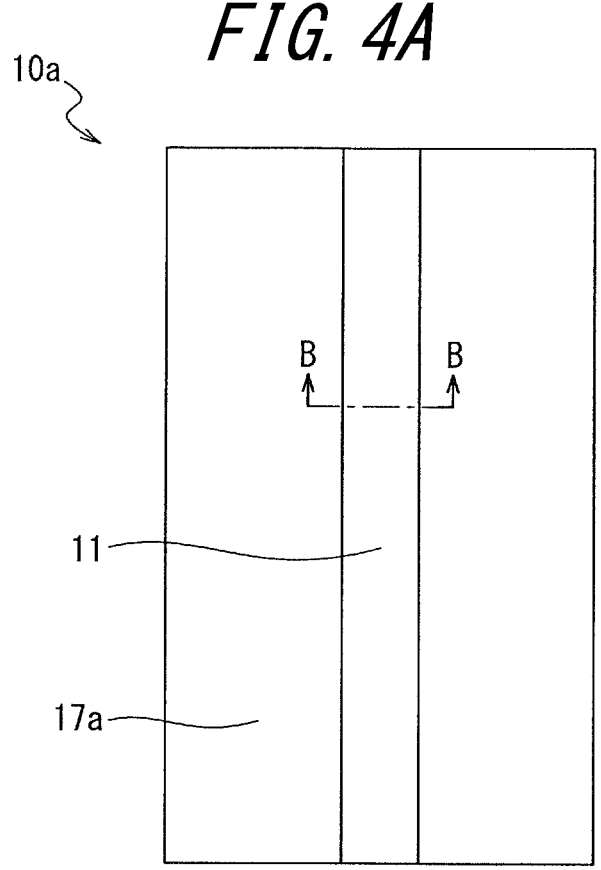
FIG. 4A is a manufacturing process plan view (part 2) of the optical waveguide 10 to illustrate the method of manufacturing the optical waveguide 10 according to the first embodiment of the present disclosure.
Figure 4B:
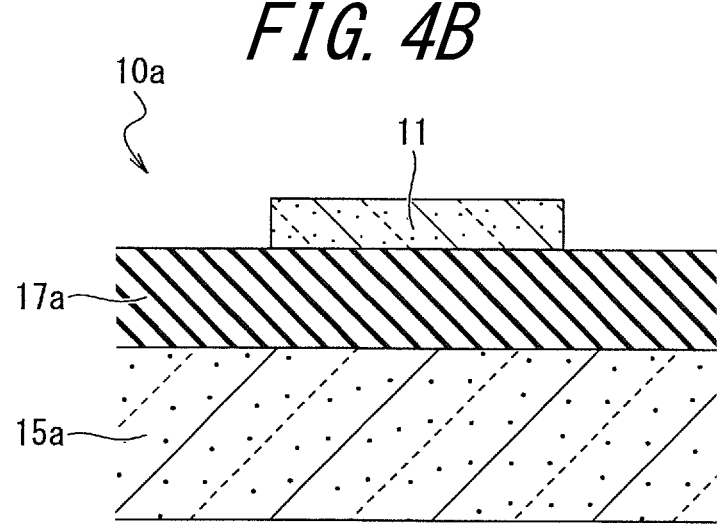
FIG. 4B is a cross-sectional manufacturing process end view (part 2) of the optical waveguide 10, along the B-B line in FIG. 4A, to illustrate the method of manufacturing the optical waveguide 10 according to the first embodiment of the present disclosure.
Figure 5A:
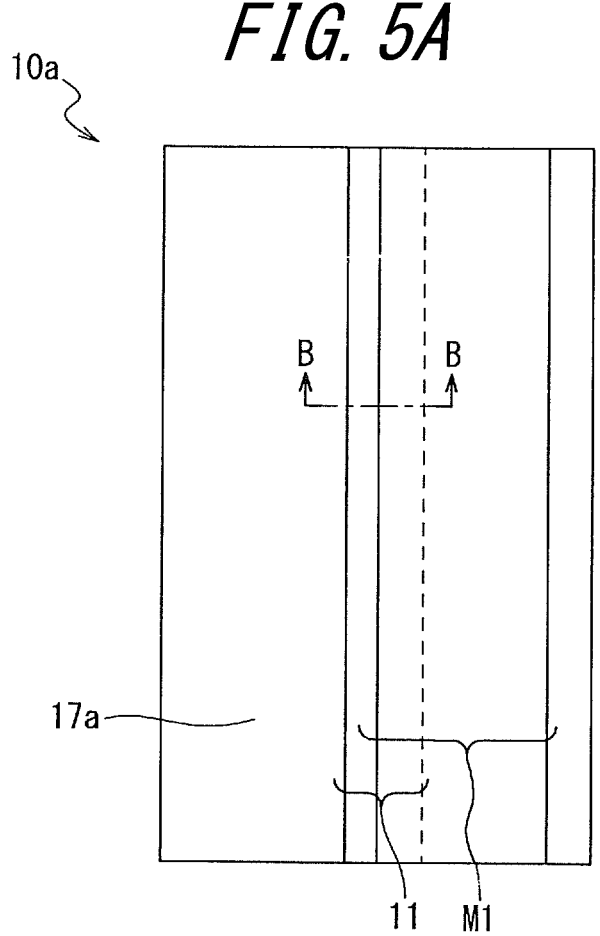
FIG. 5A is a manufacturing process plan view (part 3) of the optical waveguide 10 to illustrate the method of manufacturing the optical waveguide 10 according to the first embodiment of the present disclosure.
Figure 5B:
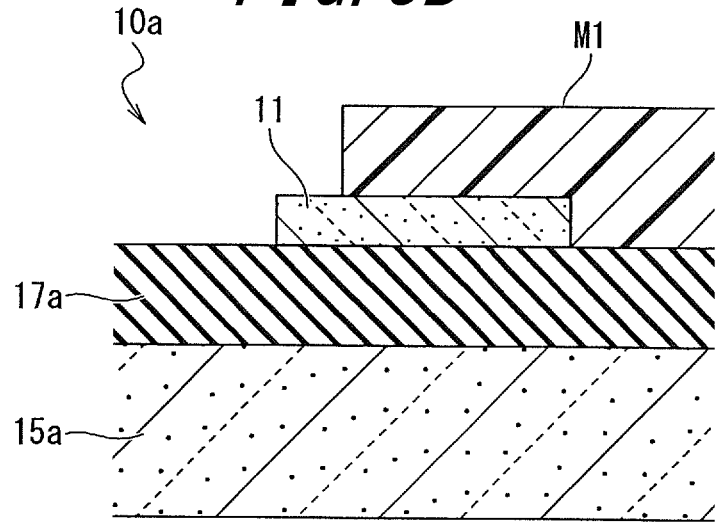
FIG. 5B is a cross-sectional manufacturing process end view (part 3) of the optical waveguide 10, along the B-B line in FIG. 5A, to illustrate the method of manufacturing the optical waveguide 10 according to the first embodiment of the present disclosure.
Figure 6A:
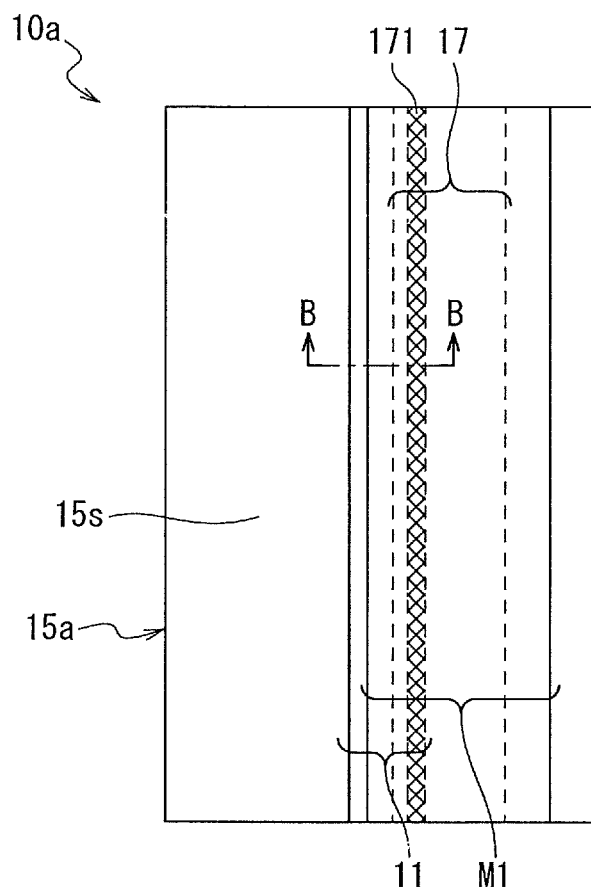
FIG. 6A is a manufacturing process plan view (part 4) of the optical waveguide 10 to illustrate the method of manufacturing the optical waveguide 10 according to the first embodiment of the present disclosure.
Figure 6B:
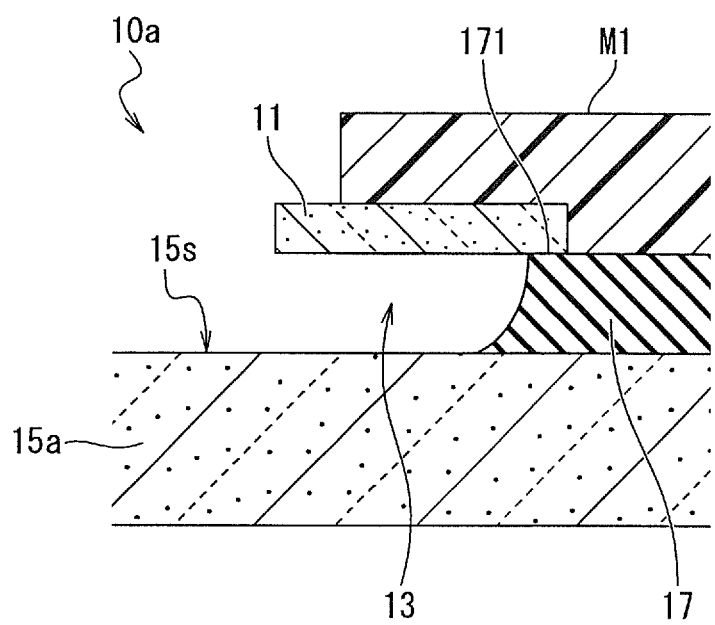
FIG. 6B is a cross-sectional manufacturing process end view (part 4) of the optical waveguide 10, along the B-B line in FIG. 6A, to illustrate the method of manufacturing the optical waveguide 10 according to the first embodiment of the present disclosure.

Next, a method of manufacturing the optical waveguide 10 according to the first embodiment is described using FIGS. 3A, 3B, 4A, 4B, 5A, 5B, 6A, and 6B, with reference to FIG. 1 and FIG. 2. FIG. 3A is a manufacturing process plan view of the optical waveguide 10, and FIG. 3B is a cross-sectional manufacturing process end view of the optical waveguide 10 along the B-B line in FIG. 3A. FIG. 4A is a manufacturing process plan view of the optical waveguide 10, and FIG. 4B is a cross-sectional manufacturing process end view of the optical waveguide 10 along the B-B line in FIG. 4A. FIG. 5A is a manufacturing process plan view of the optical waveguide 10, and FIG. 5B is a cross-sectional manufacturing process end view of the optical waveguide 10 along the B-B line in FIG. 5A. FIG. 6A is a manufacturing process plan view of the optical waveguide 10, and FIG. 6B is a cross-sectional manufacturing process end view of the optical waveguide 10 along the B-B line in FIG. 6A. A plurality of optical waveguide main portions are simultaneously formed on one support substrate 15a and subsequently separated to manufacture the optical waveguide 10. In FIGS. 3A, 3B, 4A, 4B, 5A, 5B, 6A, and 6B, only one optical waveguide main portion among a plurality of optical waveguide main portions is illustrated.

First, an $SiO_2$ film is formed on either or both of the support substrate 15a, which is formed from silicon and ultimately becomes the substrate 15, and an active substrate 11a, which is formed from silicon and from which the core layer 11 is formed. The support substrate 15a and the active substrate 11a are then stuck together, with the $SiO_2$ film therebetween, and thermally treated to be joined. The active substrate 11a is then ground, polished, or the like to a predetermined thickness to adjust the film thickness of the active substrate 11a. Consequently, as illustrated in FIGS. 3A, 3B, an SOI substrate 100 is formed to have a "silicon-insulating layer-silicon" structure that includes the support substrate 15a, a BOX layer 17a formed on the support substrate 15a, and the active substrate 11a formed on the BOX layer 17a.

Next, lithography and etching are used on the SOI substrate 100 to etch the active substrate 11a and form a core layer 11 in the shape of a rectangular parallelepiped. Consequently, as illustrated in FIGS. 4A, 4B, an optical waveguide main portion 10a is formed to include the plate-shaped support substrate 15a, the plate-shaped BOX layer 17a formed on the support substrate 15a, and the core layer 11 formed as a rectangular prism on a portion of the BOX layer 17a.

Next, as illustrated in FIGS. 5A, 5B, a mask layer M1 covering a portion of the core layer 11 and the BOX layer 17a is formed. The mask layer M1 is positioned towards one end from the widthwise center of the core layer 11. The mask layer M1 may be a photoresist or a hard mask such as a silicon nitride film.

Next, a portion of the BOX layer 17a of the optical waveguide main portion 10a is removed by wet etching or the like, with the mask layer M1 as a mask. Consequently, as illustrated in FIGS. 6A, 6B, the support 17 is formed at a position towards one side (the right in FIG. 6B) from the widthwise center of the core layer 11 (i.e. a position shifted in the width direction from the optical axis OA of the infrared light propagating through the core layer 11). This yields a structure in which a portion of the core layer 11 is floating. In other words, the connecting portion 171 of the support 17 connected to the core layer 11 is not located at a position, on the outer surface, with the shortest distance from the center of the core layer 11 (the widthwise center of the outer surface when the core layer 11 is elongated widthwise as in FIG. 6B) in a plane orthogonal to the longitudinal direction, which is the propagation direction of the infrared light. Rather, the connecting portion 171 is formed towards one of the ends from the widthwise center of the core layer 11. The space 13 is formed between the center of the core layer 11 and a principal surface 15s of the substrate 15.

Subsequently, the mask layer M1 is etched. After etching of the mask layer M1, a protective film may be formed on the surface of the core layer 11. This protective film may be a film including nitrogen, and the film thickness may be 1 nm or more and less than 20 nm. Inclusion of the protective film on the surface of the core layer 11 can prevent deterioration of the surface of the core layer 11, due to natural oxidation or the like, while maintaining the measurement sensitivity of the optical waveguide 10 with respect to the substance to be measured.

Furthermore, the slit-shaped grating coupler 118 is subsequently formed at one end in the longitudinal direction of the core layer 11, and the slit-shaped grating coupler 119 is formed at the other end in the longitudinal direction of the core layer 11 (see FIG. 1). The grating coupler 118 and the grating coupler 119 may be formed simultaneously with the core layer 11 or formed earlier than the core layer 11.

Next, the support substrate 15a is cut in a predetermined region to separate the optical waveguide main portion 10a. The optical waveguide 10 with the support 17 shifted from the optical axis OA of the infrared light propagating through the core layer 11 is thus completed (see FIG. 2).

Furthermore, as illustrated in FIG. 1, the light source 20 is installed to be capable of emitting the infrared light IR onto the grating coupler 118 of the optical waveguide 10, and the light detector 40 is disposed to be capable of detecting the infrared light IR emitted from the grating coupler 119 of the optical waveguide 10, thereby completing the optical concentration measuring apparatus 1.

SECOND EMBODIMENT

Figure 7:
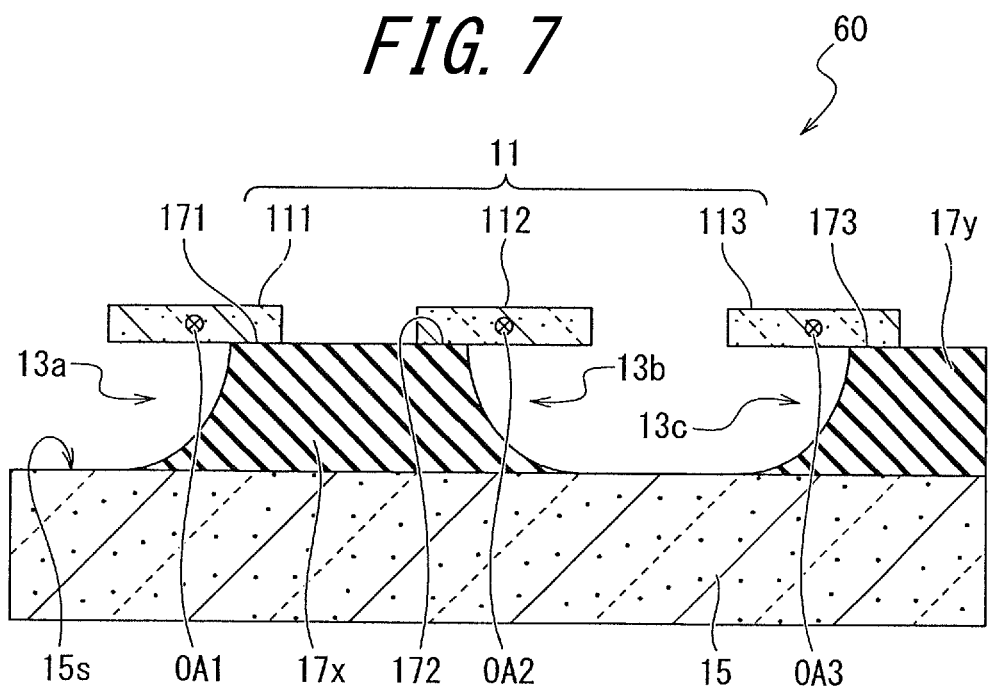
FIG. 7 illustrates an optical waveguide 60 according to a second embodiment of the present disclosure.

Next, an optical waveguide according to the second embodiment of the present disclosure is described with reference to FIG. 7. The optical waveguide according to the second embodiment is characterized by use in a region with a densely packed core layer. FIG. 7 is a cross-section of the optical waveguide according to the second embodiment in a plane orthogonal to the longitudinal direction, which is the propagation direction of light.

As illustrated in FIG. 7, an optical waveguide 60 according to the second embodiment includes a substrate 15, a core layer 11 formed on the substrate 15, and a plurality (two in the second embodiment) of supports 17x, 17y supporting the core layer 11 with respect to the substrate 15. In the second embodiment, the core layer 11 includes a plurality (three in the second embodiment) of separated portions 111, 112, 113. The separated portion 111, separated portion 112, and separated portion 113 are arranged in close proximity to each other. The separated portions 111, 112, 113 are, for example, branches of the core layer 11.

The support 17x includes a plurality (two in the second embodiment) of spatially separated connecting portions 171, 172. The connecting portions 171, 172 extend in the longitudinal direction, which is the propagation direction of light through the core layer 11. The connecting portions 171, 172 are provided at the ends in the width direction on the upper surface of the support 17x. The connecting portion 171 is provided at one end, and the connecting portion 172 is provided at the other end. The separated portion 111 is connected to the connecting portion 171, and the separated portion 112 is connected to the connecting portion 172. The support 17x connects at least a portion of the separated portion 111 and at least a portion of the separated portion 112 with at least a portion of the substrate 15 to support the separated portions 111, 112 with respect to the substrate 15.

In a plane that is orthogonal to the longitudinal direction, which is the propagation direction of light, and that includes the separated portion 111 of the core layer 11, the connecting portion 171 is not located at a position, on the outer surface, with the shortest distance from the center of the separated portion 111 of the core layer 11 (the widthwise center of the outer surface when the separated portion 111 of the core layer 11 is elongated widthwise as in FIG. 7). Rather, the connecting portion 171 is formed towards one of the ends from the widthwise center of the separated portion 111. Therefore, the optical waveguide 60 includes a space 13a below the separated portion 111 of the core layer 11, without including a predetermined layer such as a cladding layer.

In a plane that is orthogonal to the longitudinal direction, which is the propagation direction of light, and that includes the separated portion 112 of the core layer 11, the connecting portion 172 is not located at a position, on the outer surface, with the shortest distance from the center of the separated portion 112 of the core layer 11 (the widthwise center of the outer surface when the separated portion 112 of the core layer 11 is elongated widthwise as in FIG. 7). Rather, the connecting portion 172 is formed towards one of the ends from the widthwise center of the separated portion 112. Therefore, the optical waveguide 60 includes a space 13b below the separated portion 112 of the core layer 11, without including a predetermined layer such as a cladding layer.

The support 17y is provided next to the support 17x on the connecting portion 172 side of the support 17x. The separated portion 113 of the core layer 11 is connected to the connecting portion 173 of the support 17y. The support 17y connects at least a portion of the separated portion 113 with at least a portion of the substrate 15 to support the separated portion 113 with respect to the substrate 15. In a plane that is orthogonal to the longitudinal direction, which is the propagation direction of light, and that includes the separated portion 113 of the core layer 11, the connecting portion 173 is not located at a position, on the outer surface, with the shortest distance from the center of the separated portion 113 of the core layer 11 (the widthwise center of the outer surface when the separated portion 113 of the core layer 11 is elongated widthwise as in FIG. 7). Rather, the connecting portion 173 is formed towards one of the ends from the widthwise center of the separated portion 113. Therefore, the optical waveguide 60 includes a space 13c below the separated portion 113 of the core layer 11, without including a predetermined layer such as a cladding layer.

The spaces 13a, 13b, 13c are filled with a substance to be measured, such as a gas or liquid. Consequently, the optical waveguide 60 can increase the amount of interaction between the substance to be measured and the evanescent wave at the separated portion 111, the amount of interaction between the substance to be measured and the evanescent wave at the separated portion 112, and the amount of interaction between the substance to be measured and the evanescent wave at the separated portion 113. Furthermore, the optical waveguide 60 can reduce the absorption of infrared light by the supports 17x, 17y. The sensitivity of the optical concentration measuring apparatus using the optical waveguide 60 therefore improves. This configuration, with one support 17x connected to two separated portions 111, 112 among the plurality of separated portions 111, 112, 113 of the core layer 11, also allows the supports 17x, 17y to be formed efficiently over a small area.

The optical waveguide 60 according to the second embodiment includes the core layer 11 that has three separated portions 111, 112, 113, but this configuration is not limiting. The optical waveguide 60 may include a plurality (three in the second embodiment) of core layers. For example, in this case, two adjacent core layers among the three core layers are connected to the connecting portions 171, 172 of the support 17x, and the remaining core layer is connected to the connecting portion 173 of the support 17y. Similar effects as when the optical waveguide 60 includes the core layer 11 having three separated portions 111, 112, 113 are thus obtained. In another example, the optical waveguide 60 may have a layout in which one long optical waveguide is folded back. Two adjacent core layer sections, in a region where three sections of the folded back core layer are in a row, are connected to the connecting portions 171, 172 of the support 17x, and the remaining core layer section is connected to the connecting portion 173 of the support 17y. Similar effects as when the optical waveguide 60 includes the core layer 11 having three separated portions 111, 112, 113 are thus obtained.

A method of manufacturing the optical waveguide 60 according to the second embodiment is similar to that of the optical waveguide 10 according to the first embodiment, except for a difference in the shape of the core layer 11 and the mask layer for forming the supports 17x, 17y. Hence, a description thereof is omitted.

THIRD EMBODIMENT

Next, an optical waveguide according to the third embodiment of the present disclosure is described with reference to FIGS. 8, 9A, 9B, 10A, and 10B. The optical waveguide according to the third embodiment is characterized by multi-mode propagation of light through the core layer. First, the schematic configuration of an optical waveguide 70 according to the third embodiment is described with reference to FIG. 8.

Figure 8:
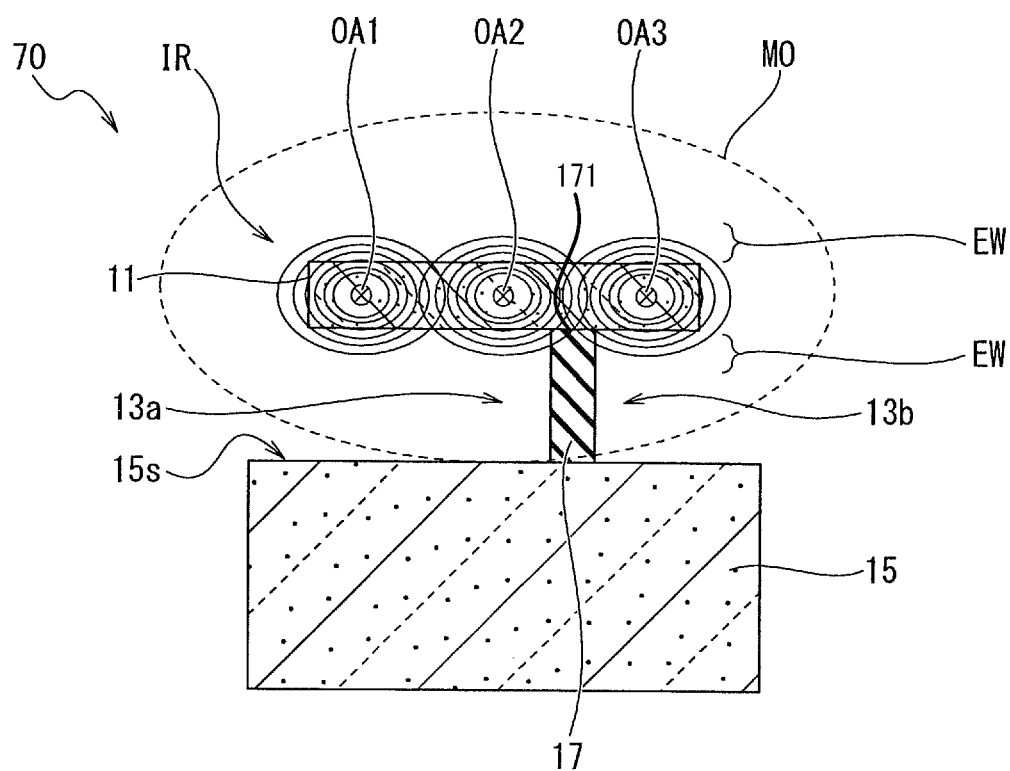
FIG. 8 illustrates an optical waveguide 70 according to a third embodiment of the present disclosure, illustrating multi-mode propagation of light through a core layer 11.

As illustrated in FIG. 8, the optical waveguide 70 includes a substrate 15, a core layer 11 provided on the substrate 15, and a support 17 configured to connect at least a portion of the substrate 15 with at least a portion of the core layer 11 and support the core layer 11 with respect to the substrate 15. The optical waveguide 70 is configured for light (infrared light in the third embodiment) to propagate through the core layer 11 along a plurality (three in the third embodiment) of optical axes OA1, OA2, OA3.

The connecting portion 171 of the support 17 connected to the core layer 11 is provided between the three optical axes OA1, OA2, OA3 of light (infrared light in the third embodiment) undergoing multi-mode propagation. In the third embodiment, the connecting portion 171 of the support 17 is provided between the optical axis OA2 and the optical axis OA3. In this way, the connecting portion 171 of the support 17 connected to the core layer 11 is not provided between the optical axes OA1, OA2, OA3 of light and a principal surface 15s of the substrate 15. The optical axis OA2 nearly matches the center of the core layer 11. Therefore, the connecting portion 171 of the support 17 connected to the core layer 11 is not located at a position, on the outer surface, with the shortest distance from the center of the core layer 11 (the widthwise center of the outer surface when the core layer 11 is elongated widthwise as in FIG. 8) in a plane orthogonal to the longitudinal direction, which is the propagation direction of light. Rather, the connecting portion 171 is formed towards one of the ends from the widthwise center of the core layer 11.

The optical waveguide 70 thus includes spaces 13a, 13b filled with a substance to be measured MO. The space 13a is provided between the principal surface 15s of the substrate 15 and the optical axes OA1, OA2, along which infrared light propagates through the core layer 11. The space 13b is provided between the principal surface 15s of the substrate 15 and the optical axis OA3 of the light. The support 17 in the optical waveguide 70 can thereby be removed from the regions where the evanescent wave EW is most concentrated. Accordingly, the optical waveguide 70 can prevent a decrease, due to the support 17, in the detection characteristics of the substance to be measured MO.

Figure 9A:
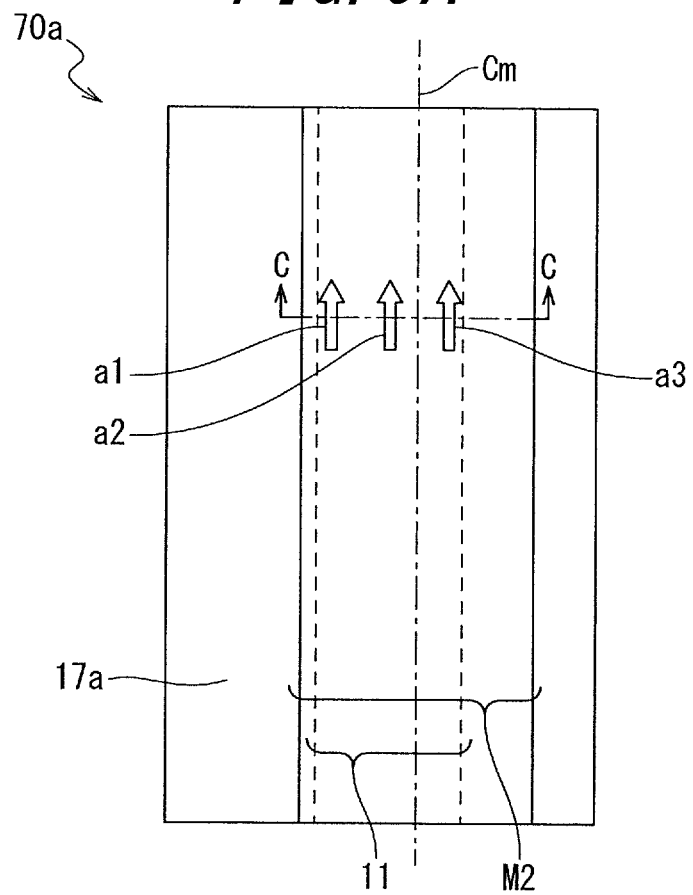
FIG. 9A is a manufacturing process plan view (part 1) of the optical waveguide 10 to illustrate the method of manufacturing the optical waveguide 70 according to the third embodiment of the present disclosure.
Figure 9B:
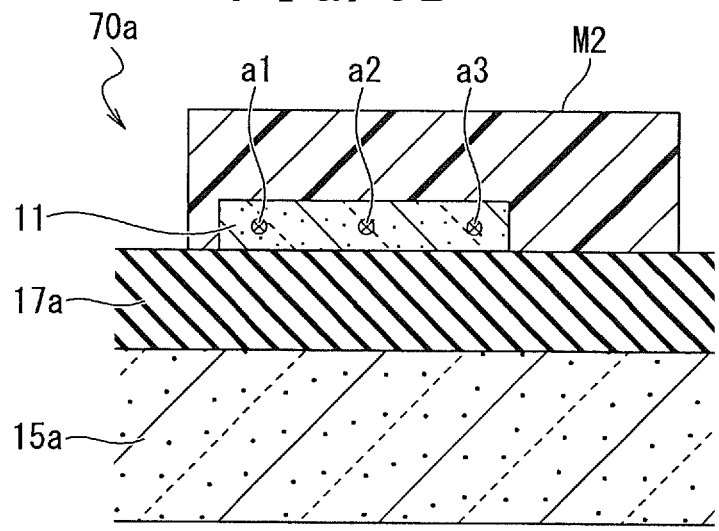
FIG. 9B is a cross-sectional manufacturing process end view (part 1) of the optical waveguide 70, along the C-C line in FIG. 9A, to illustrate the method of manufacturing the optical waveguide 70 according to the third embodiment of the present disclosure.
Figure 10A:
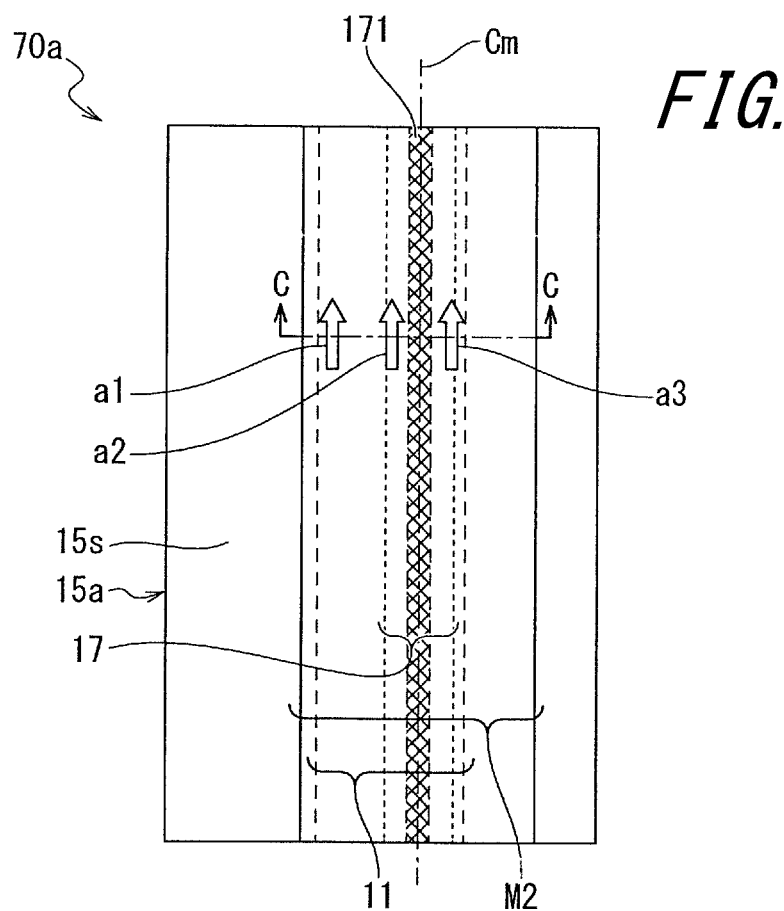
FIG. 10A is a manufacturing process plan view (part 2) of the optical waveguide 70 to illustrate the method of manufacturing the optical waveguide 70 according to the third embodiment of the present disclosure.
Figure 10B:
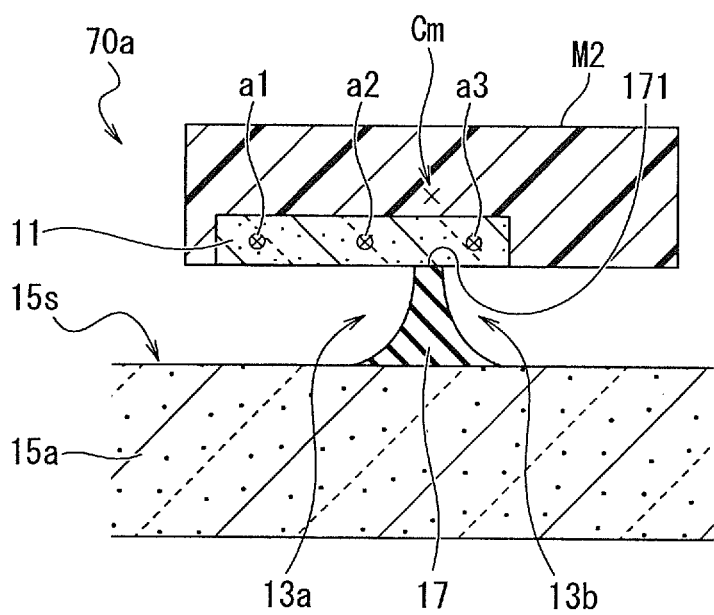
FIG. 10B is a cross-sectional manufacturing process end view (part 2) of the optical waveguide 70, along the C-C line in FIG. 10A, to illustrate the method of manufacturing the optical waveguide 70 according to the third embodiment of the present disclosure.

Next, a method of manufacturing the optical waveguide 70 according to the third embodiment is described using FIGS. 9A, 9B, 10A, and 10B, with reference to FIGS. 3A, 3B, 4A, 4B, and 8. FIG. 9A is a manufacturing process plan view of the optical waveguide 70, and FIG. 9B is a cross-sectional manufacturing process end view of the optical waveguide 70 along the C-C line in FIG. 9A. FIG. 10A is a manufacturing process plan view of the optical waveguide 70, and FIG. 10B is a cross-sectional manufacturing process end view of the optical waveguide 70 along the C-C line in FIG. 10A. A plurality of optical waveguide main portions are simultaneously formed on one support substrate 15a and subsequently separated to manufacture the optical waveguide 70. In FIGS. 9A, 9B, 10A, and 10B, only one optical waveguide main portion among a plurality of optical waveguide main portions is illustrated.

First, as in the first embodiment, an SiO$_2$ film is formed on either or both of the support substrate 15a, which is formed from silicon and ultimately becomes the substrate 15, and an active substrate 11a, which is formed from silicon and from which the core layer 11 is formed. The support substrate 15a and the active substrate 11a are then stuck together, with the SiO$_2$ film therebetween, and thermally treated to be joined. The active substrate 11a is then ground, polished, or the like to a predetermined thickness to adjust the film thickness of the active substrate 11a. Consequently, as illustrated in FIGS. 3A, 3B, an SOI substrate 100 is formed to have a "silicon-insulating layer-silicon" structure that includes the support substrate 15a, a BOX layer 17a formed on the support substrate 15a, and the active substrate 11a formed on the BOX layer 17a.

Next, as in the first embodiment, lithography and etching are used on the SOI substrate 100 to etch the active substrate 11a and form a core layer 11 in the shape of a rectangular parallelepiped. Consequently, as illustrated in FIGS. 4A, 4B, an optical waveguide main portion 70a (corresponding to the optical waveguide main portion 10a of FIG. 4) is formed to include the plate-shaped support substrate 15a, the plate-shaped BOX layer 17a formed on the support substrate 15a, and the core layer 11 formed as a rectangular prism on a portion of the BOX layer 17a.

Next, as illustrated in FIGS. 9A, 9B, a mask layer M2 is formed to have a center line Cm arranged among axes a1, a2, a3 from which the optical axes OA1, OA2, OA3 will be formed. The mask layer M2 may be a photoresist or a hard mask such as a silicon nitride film.

Next, a portion of the BOX layer 17a of the optical waveguide main portion 70a is removed by wet etching or the like, with the mask layer M2 as a mask. Consequently, as illustrated in FIGS. 10A, 10B, the support 17 is formed between the axes a2, a3, from which the optical axes OA2, OA3 will be formed, at a position in the width direction corresponding to the center line Cm of the mask layer M2. This yields a structure in which a portion of the core layer 11 is floating. In other words, the connecting portion 171 of the support 17 connected to the core layer 11 is not located at a position, on the outer surface, with the shortest distance from the center of the core layer 11 (the widthwise center of the outer surface when the core layer 11 is elongated widthwise as in FIG. 10B) in a plane orthogonal to the longitudinal direction, which is the propagation direction of light (infrared light in the third embodiment). Rather, the connecting portion 171 is formed towards one of the ends from the widthwise center of the core layer 11. The connecting portion 171 of the support 17 connected to the core layer 11 is therefore not provided between the principal surface 15s of the substrate 15 connected to the support 17 and the axes a2, a3 corresponding to the optical axes OA2, OA3 of light. A space 13a forms between the axes a1, a2, which will become the optical axes OA1, OA2 of multimode light propagating through the core layer 11, and the principal surface 15s of the substrate 15. A space 13b forms between the axis a3, which becomes the optical axis OA3 of the light, and the principal surface 15s of the substrate 15.

Subsequently, the mask layer M2 is etched. After etching of the mask layer M2, a protective film may be formed on the surface of the core layer 11, as in the first embodiment. This protective film may be a film including nitrogen, and the film thickness may be 1 nm or more and less than 20 nm. Inclusion of the protective film on the surface of the core layer 11 can prevent deterioration of the surface of the core layer 11, due to natural oxidation or the like, while maintaining the measurement sensitivity of the optical waveguide 70 with respect to the substance to be measured.

Subsequently, a slit-shaped input-side grating coupler like the grating coupler 118 in FIG. 1 is further formed at one end in the longitudinal direction of the core layer 11, and a slit-shaped output-side grating coupler like the grating coupler 119 in FIG. 1 is further formed at the other end in the longitudinal direction of the core layer 11. The grating coupler 118 and the grating coupler 119 may be formed simultaneously with the core layer 11 or formed earlier than the core layer 11.

Next, the support substrate 15a is cut in a predetermined region to separate the optical waveguide main portion 70a. This completes the optical waveguide 70 (see FIG. 8), in which the connecting portion 171 of the support 17 is positioned between the optical axis OA2 and the optical axis OA3 of light propagating through the core layer 11.

Furthermore, while omitted from the drawings, a light source 20 is installed to be capable of emitting infrared light onto the input-side grating coupler of the optical waveguide 70, and a light detector 40 is disposed to be capable of detecting the infrared light emitted from the output-side grating coupler of the optical waveguide 70, thereby completing an optical concentration measuring apparatus.

In this way, the optical waveguide 70 is structured so that the connecting portion 171 of the support 17 that supports the core layer 11 is shifted in the width direction from the optical axes OA1, OA2, OA3 of light propagating through the core layer 11. This can prevent a decrease, due to the support 17, in the detection characteristics of the substance to be measured MO.

As described above, the first through third embodiments can provide an optical waveguide and an optical concentration measuring apparatus that have a support for supporting the core layer without reducing the sensitivity of a sensor.

Furthermore, the optical waveguide according to the first through third embodiments can increase the amount of interaction between the evanescent wave of light propagating through the core layer and the substance to be measured and can reduce the amount of the evanescent wave that is absorbed by the support. The optical waveguide according to the first through third embodiments can thereby stably detect the substance to be measured, in a variety of modes of use, with high sensitivity.

FOURTH EMBODIMENT

An optical waveguide and an optical concentration measuring apparatus according to the fourth embodiment of the present disclosure are described with reference to FIG. 11 through FIG. 26.

Figure 11:
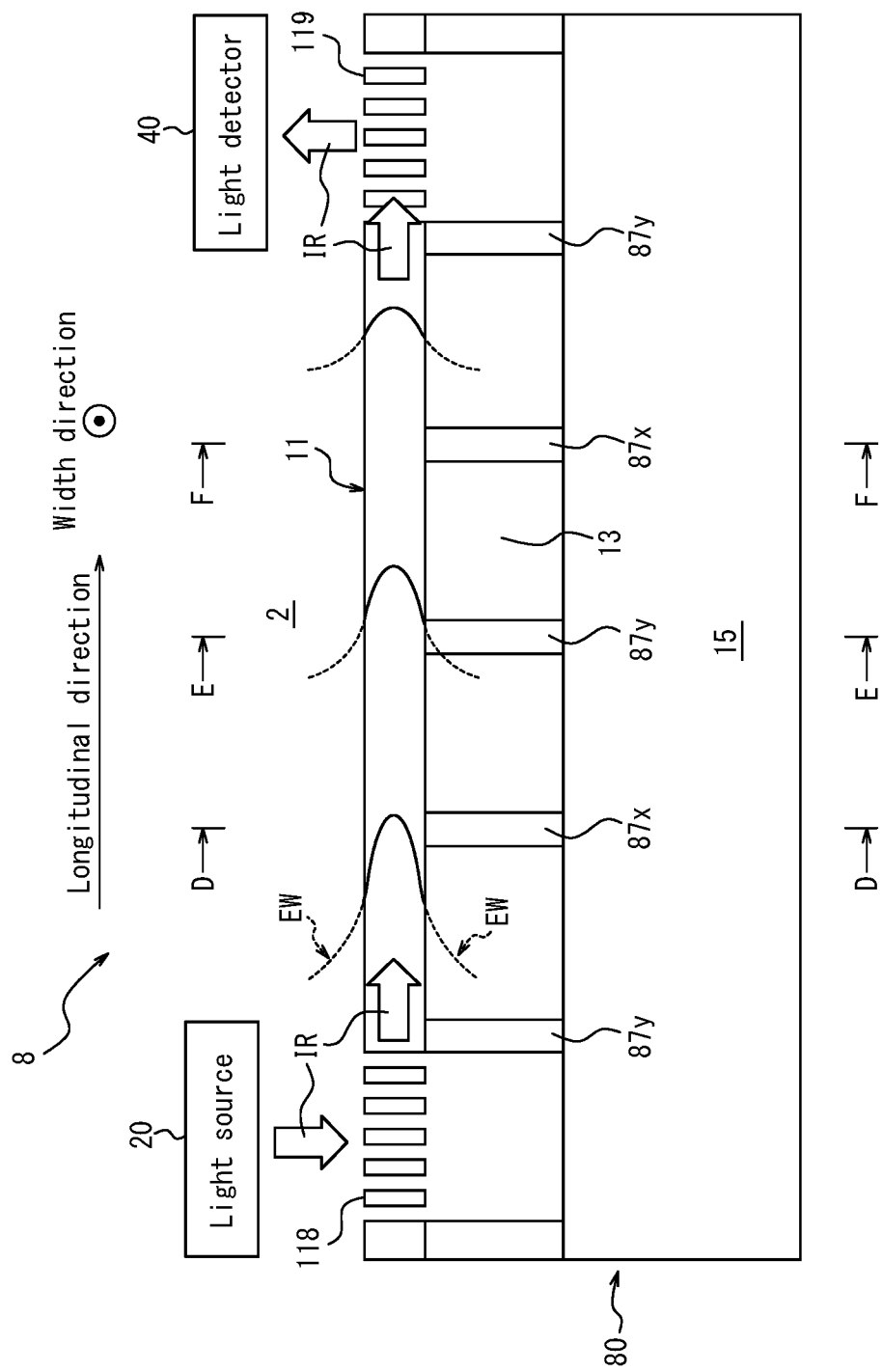
FIG. 11 illustrates the schematic configuration of an optical waveguide 80 and an optical concentration measuring apparatus 8 according to a fourth embodiment of the present disclosure and illustrates sensing by the ATR method using the optical concentration measuring apparatus 8.

FIG. 11 illustrates the schematic configuration of an optical concentration measuring apparatus 8 according to the fourth embodiment and is also a conceptual drawing of the ATR method using an optical waveguide 80 according to the fourth embodiment.

As illustrated in FIG. 11, the optical concentration measuring apparatus 8 is installed and used in an exterior space 2 containing a gas whose concentration or the like is to be detected. The optical concentration measuring apparatus 8 includes the optical waveguide 80 according to the fourth embodiment, a light source 20 capable of causing light (infrared light IR in the fourth embodiment) to enter a core layer 11 provided in the optical waveguide 80, and a light detector (an example of a detector) 40 capable of detecting the infrared light IR that has propagated through the core layer 11.

The optical waveguide 80 includes a substrate 15, the core layer 11 through which the infrared light IR (an example of light) can propagate, and a first support 87x and a second support 87y configured to connect at least a portion of the substrate 15 with at least a portion of the core layer 11 and discontinuously support the core layer 11 with respect to the substrate 15. The core layer 11 and the substrate 15 are formed from silicon (Si), and the first support 87x and the second support 87y are formed from silicon dioxide (SiO$_2$).

The substrate 15 is plate-shaped, for example. The core layer 11 is a rectangular parallelepiped, for example. The optical waveguide 80 includes a grating coupler 118 formed at one end of the core layer 11 in the longitudinal direction and a grating coupler 119 formed at the other end of the core layer 11 in the longitudinal direction. The grating coupler 118 is disposed in the emission direction of the light source 20 (in the fourth embodiment, vertically downward in a state such that the stacking direction of the optical waveguide 10 is parallel to the vertical direction and the substrate 15 is disposed to face vertically downward). The grating coupler 118 couples the infrared light IR incident from the light source 20 with the infrared light IR propagating through the core layer 11. The grating coupler 119 is disposed in a direction facing the light detector 40 (in the fourth embodiment, vertically downward in a state such that the stacking direction of the optical waveguide 10 is parallel to the vertical direction and the substrate 15 is disposed to face vertically downward). The grating coupler 119 extracts the infrared light IR propagating through the core layer 11 and emits the infrared light IR towards the light detector 40.

Figure 12:
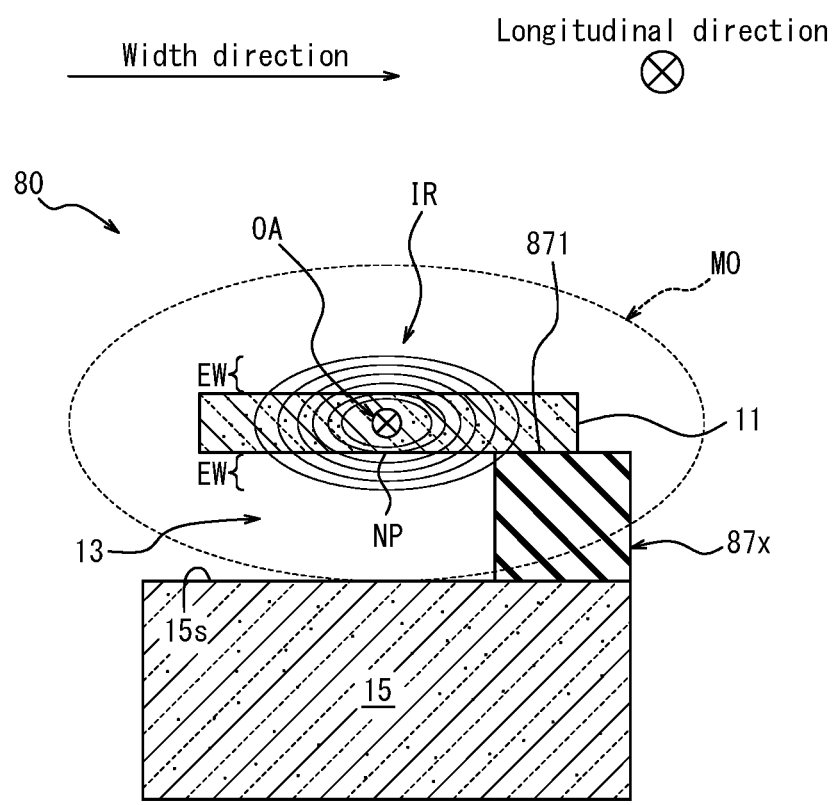
FIG. 12 is a cross-sectional end view of the optical waveguide 80, along the D-D line and F-F line in FIG. 11, illustrating the schematic configuration of the optical waveguide 80 according to the fourth embodiment of the present disclosure.
Figure 13:
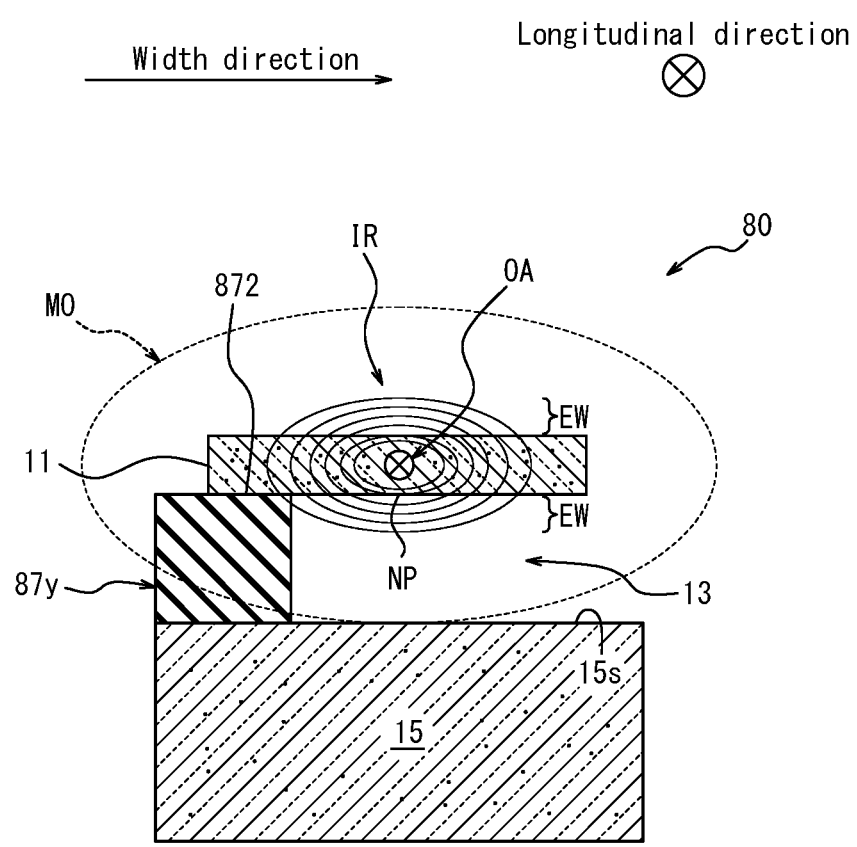
FIG. 13 is a cross-sectional end view of the optical waveguide 80, along the E-E line in FIG. 11, illustrating the schematic configuration of the optical waveguide 80 according to the fourth embodiment of the present disclosure.
Figure 14:
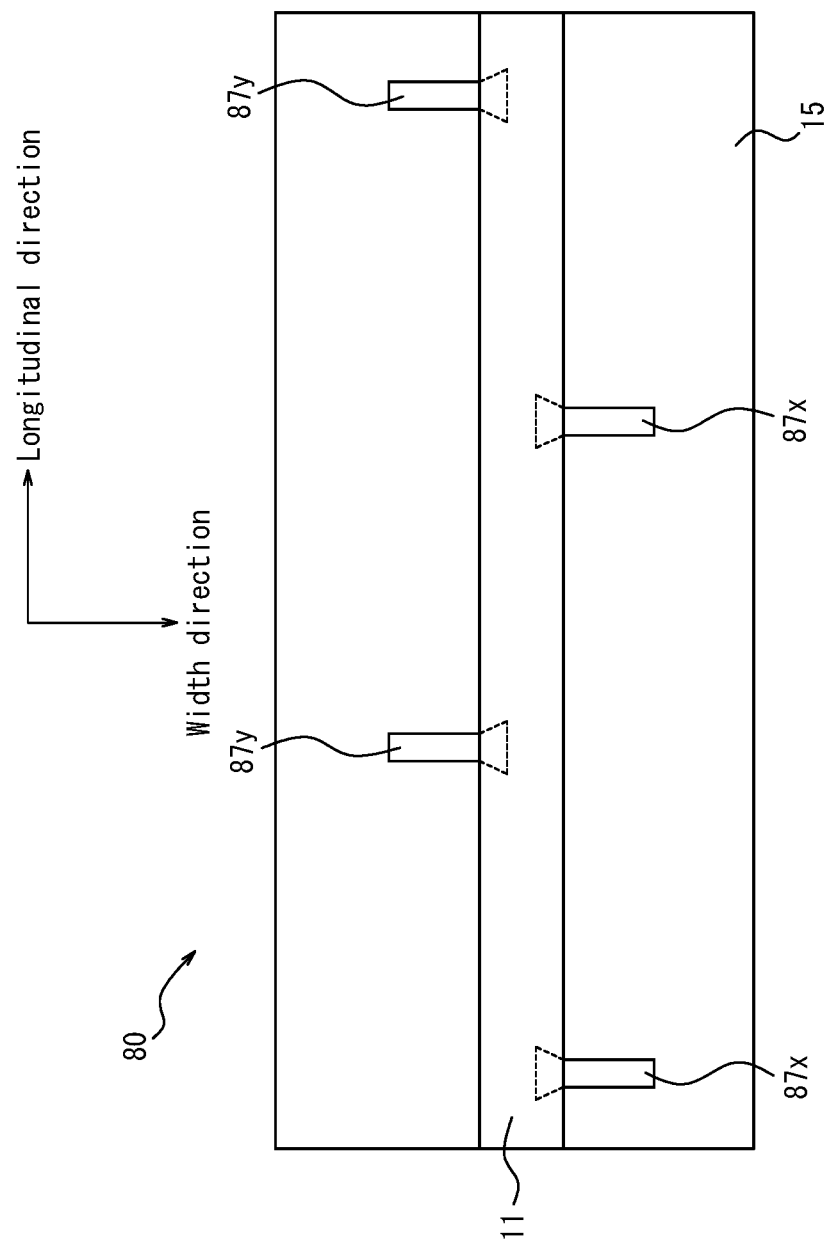
FIG. 14 is a plan view of the optical waveguide 80, as seen from a light source 20 or light detector 40 side, to illustrate the arrangement of a first support 87x and a second support 87y of FIG. 11.

FIG. 12 is a cross-sectional end view along the D-D line and F-F line in FIG. 11, and FIG. 13 is a cross-sectional end view along the E-E line in FIG. 11. FIG. 14 is a plan view of the optical waveguide 80, as seen from the light source 20 or light detector 40 side, to illustrate the arrangement of the first support 87x and the second support 87y.

As illustrated in FIGS. 11, 12, and 13, the optical waveguide 80 is structured to include a space 13 between the core layer 11 and the substrate 15, without including a predetermined layer such as a cladding layer, except in a region where the first support 87x or the second support 87y is provided.

As illustrated in FIG. 12, a connecting portion 871 of the first support 87x connected to the core layer 11 is shifted from the position NP having the shortest distance from the center to the outer surface in a cross-section perpendicular to the longitudinal direction of the core layer 11 (in the fourth embodiment, the central position in the width direction of the cross-section). The connecting portion 871 of the first support 87x is positioned towards one end (the right end in FIG. 12) from the widthwise center of the core layer 11. As also illustrated in FIG. 11, the connecting portion 871 of the first support 87x is discontinuous in the longitudinal direction.

As illustrated in FIG. 13, a connecting portion 872 of the second support 87y connected to the core layer 11 is shifted from the position NP having the shortest distance from the center to the outer surface in a cross-section perpendicular to the longitudinal direction of the core layer 11 (in the fourth embodiment, the central position in the width direction of the cross-section). The connecting portion 872 of the second support 87y is positioned towards the opposite end (the left end in FIG. 13) from the connecting portion 871 of the first support 87x in the width direction of the core layer 11. As also illustrated in FIG. 11, the connecting portion 872 of the second support 87y is discontinuous in the longitudinal direction.

At least the connecting portions 871, 872 of the first support 87x and the second support 87y are alternately present along the longitudinal direction of the core layer 11. Furthermore, as illustrated in FIGS. 11 and 14, the first support 87x and the second support 87y are alternately present along the longitudinal direction of the core layer 11.

Here, the effects of the optical waveguide 80 according to the fourth embodiment are described by comparison with the optical waveguide 10' that has the conventional pedestal structure illustrated in FIG. 36.

A sensor using the ATR method often uses single-mode propagation of light inside the core layer. In the example of the optical concentration measuring apparatus 8 according to the fourth embodiment as well, light (infrared light) propagates in single-mode inside the core layer 11 provided in the optical waveguide 80. In the case of multi-mode propagation as well, however, the effects of the present disclosure are obtained, since a light component propagating through the center of the core layer 11 is present. As illustrated in FIGS.

12 and 13, when infrared light IR propagates through the core layer 11 in single-mode, the optical axis OA of the infrared light IR is positioned nearly at the center of the core layer 11 in a cross-section along a plane orthogonal to the longitudinal direction, which is the propagation direction of the infrared light IR. At this time, an evanescent wave EW extending around the core layer 11 increases near the outer surface of the core layer 11 close to the optical axis OA, reaching a maximum near the outer surface where the distance from the center of the core layer 11, which overlaps with the optical axis OA, is shortest. In FIG. 36, the distribution of the evanescent wave EW of the infrared light IR propagating through the core layer 11' of the optical waveguide 10' with a conventional structure is similar to that of the optical waveguide 80 of the fourth embodiment.

In a sensor using the ATR method, the sensitivity of the sensor is raised by expanding the region of interaction between the evanescent wave extending from the core layer and the substance to be measured (i.e. expanding the exposed portion of the core layer) and decreasing the absorption of light by material other than the substance to be measured (i.e., absorption of light by the support or the like). In the structure illustrated in FIG. 36, however, the connecting portion connecting the core layer and the support for supporting the core layer is positioned near the outer surface where the distance from the center of the core layer is shortest in a cross-section along a plane orthogonal to the propagation direction of light through the core layer, as described below. The support therefore ends up overlapping with the area of the outer surface where the distance from the optical axis of light undergoing single-mode propagation is shortest. The evanescent wave extending around the core layer is greatest by the surface near the optical axis. Hence, if the support is near this outer surface, much of the evanescent wave is absorbed by the material forming the support. A sensor using an optical waveguide with such a structure thus has the problem of decreased detection sensitivity of the substance to be measured.

This problem with the conventional optical waveguide 10' is now described with reference to FIG. 36. As illustrated in FIG. 36, the support 17' in the optical waveguide 10' with a conventional structure is provided between the center of the core layer 11' and the substrate 15' within a plane (i.e. the cross-section illustrated in FIG. 36) that is orthogonal to the longitudinal direction, i.e. the propagation direction of light L, and that includes the support 17'. When the connecting portion connecting the core layer 11' and the support 17' for supporting the core layer 11' is thus positioned at the widthwise center of the core layer 11' in a cross-section along a plane orthogonal to the propagation direction of light L, the evanescent wave EW may be absorbed by the material forming the support 17', and the region of the support 17' may become an obstacle that reduces the region of interaction between the evanescent wave EW and the substance to be measured. Consequently, the sensitivity of a sensor using the optical waveguide 10' decreases.

As illustrated in FIGS. 11, 12, 13, and 14, the optical waveguide 80 according to the fourth embodiment is structured so that the core layer 11 is supported by the first support 87x and the second support 87y with respect to the substrate 15 while the space 13 is formed between the core layer 11 and the substrate 15, like the conventional optical waveguide 10'. The core layer 11 has a symmetrical structure about the center in a cross-section perpendicular to the longitudinal direction. When the propagation of the infrared light IR through the core layer 11 is single-mode, the optical axis OA of the infrared light IR propagating through the core layer 11 overlaps with the center of the core layer 11. As illustrated in FIGS. 12 and 13, the first support 87x and the second support 87y are therefore each shifted to one side from the widthwise center of the core layer 11 (to the right in FIG. 12 and to the left in FIG. 13). The first support 87x and the second support 87y can thereby be removed from the region where the evanescent wave EW is most concentrated. In other words, the respective connecting portions 871, 872 of the first support 87x and the second support 87y connecting to the core layer 11 are not at positions, near the outer surface, that are the shortest distance from the center of the core layer 11 in a cross-section perpendicular to the longitudinal direction. To increase the amount of exposure of the core layer 11, the first support 87x and the second support 87y are provided discontinuously in the longitudinal direction. Furthermore, to increase the mechanical strength of the optical waveguide 80, the connecting portions 871, 872, connected to the core layer 11, of the discontinuous first support 87x and second support 87y are arranged alternately in the longitudinal direction of the core layer 11, i.e. the propagation direction of the infrared light IR. In this way, the optical concentration measuring apparatus 8 that includes the optical waveguide 10 can have increased mechanical strength while preventing a decrease, due to the presence of the first support 87x and the second support 87y, in the detection characteristics of the substance to be measured MO insofar as possible.

Figure 15:
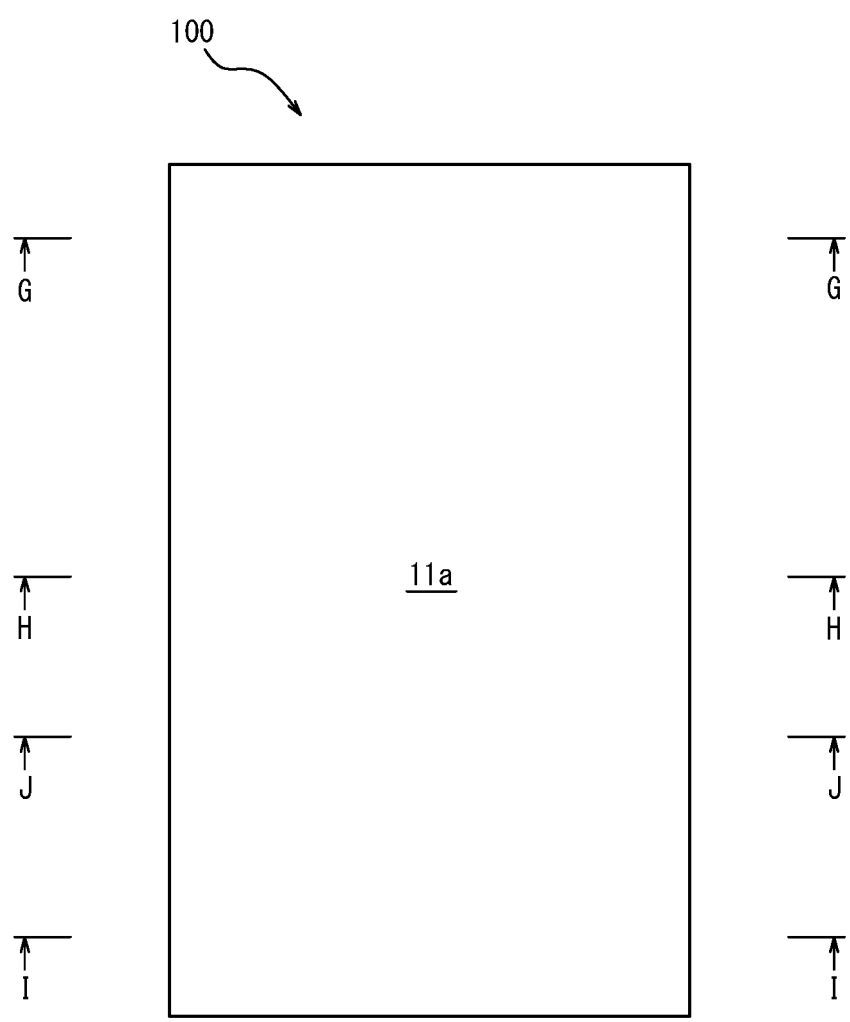
FIG. 15 is a plan view of an SOI substrate 100 to illustrate a method of manufacturing the optical waveguide 80 according to the fourth embodiment of the present disclosure.
Figure 16:
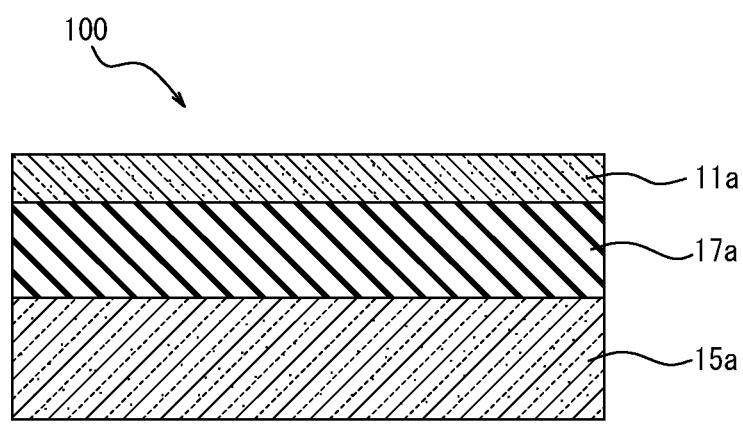
FIG. 16 is a cross-sectional end view of the SOI substrate 100 of FIG. 15 along the G-G line, I-I line, H-H line, and J-J line.
Figure 17:
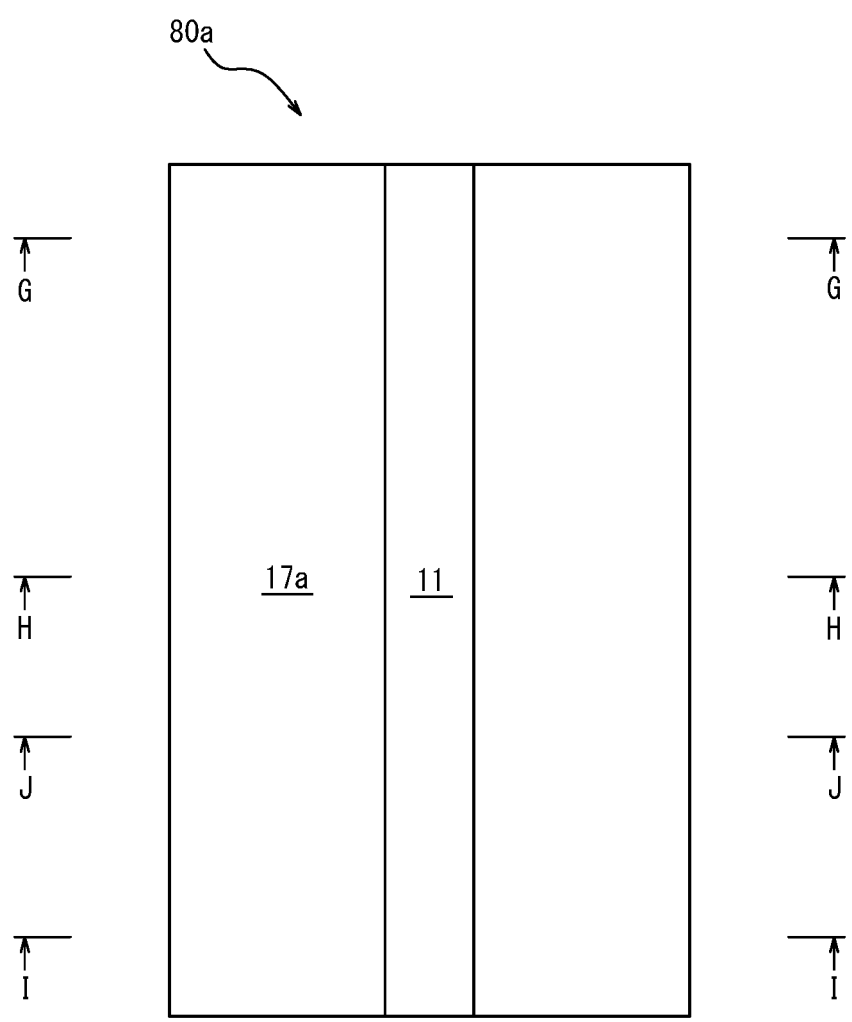
FIG. 17 is a plan view of an optical waveguide main portion 80a to illustrate the method of manufacturing the optical waveguide 80 according to the fourth embodiment of the present disclosure.
Figure 18:
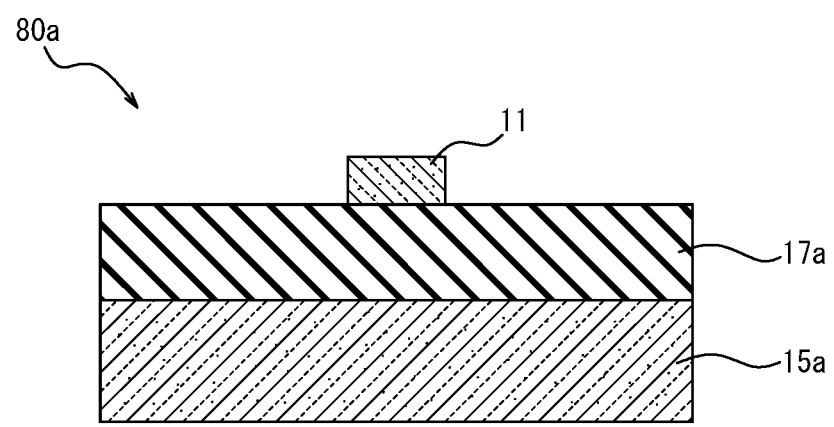
FIG. 18 is a cross-sectional end view of the optical waveguide main portion 80a of FIG. 17 along the G-G line, I-I line, H-H line, and J-J line.
Figure 19:
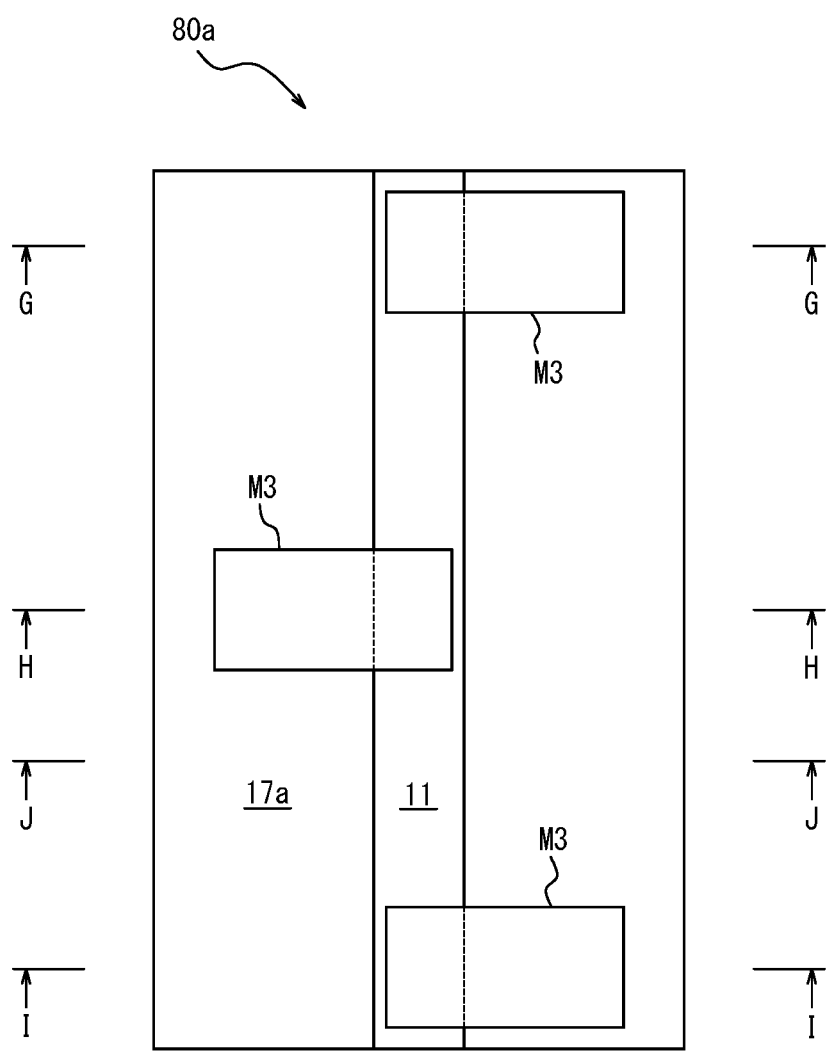
FIG. 19 is a plan view of the optical waveguide main portion 80a partially covered by a mask layer to illustrate the method of manufacturing the optical waveguide 80 according to the fourth embodiment of the present disclosure.
Figure 20:
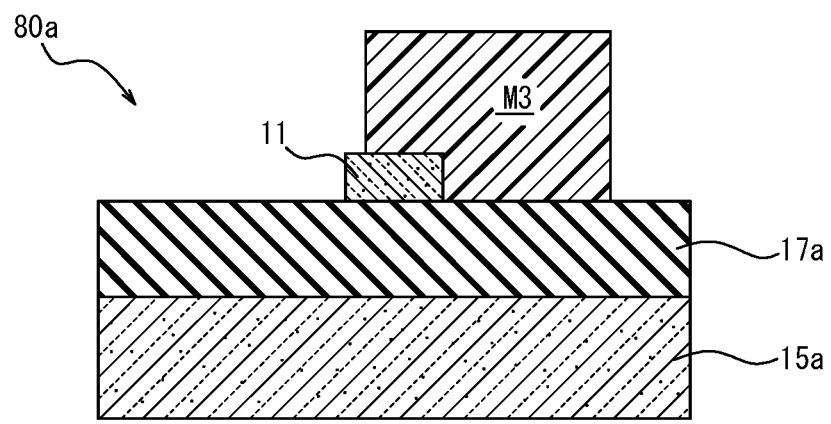
FIG. 20 is a cross-sectional end view of the optical waveguide main portion 80a of FIG. 19 along the G-G line and I-I line.
Figure 21:
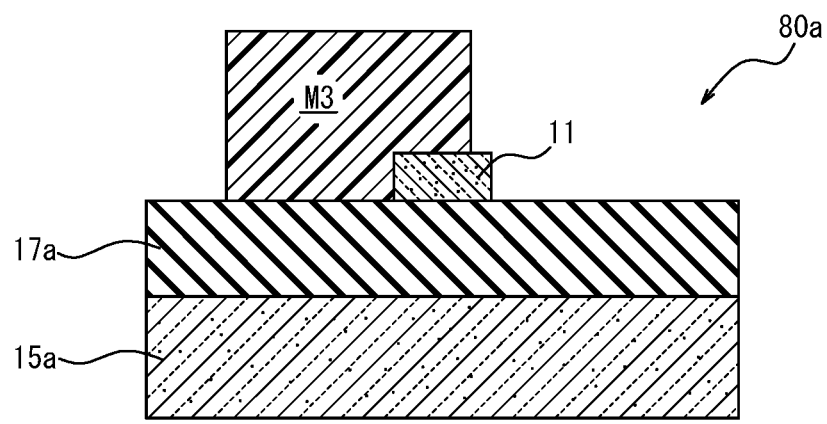
FIG. 21 is a cross-sectional end view of the optical waveguide main portion 80a of FIG. 19 along the H-H line.
Figure 22:
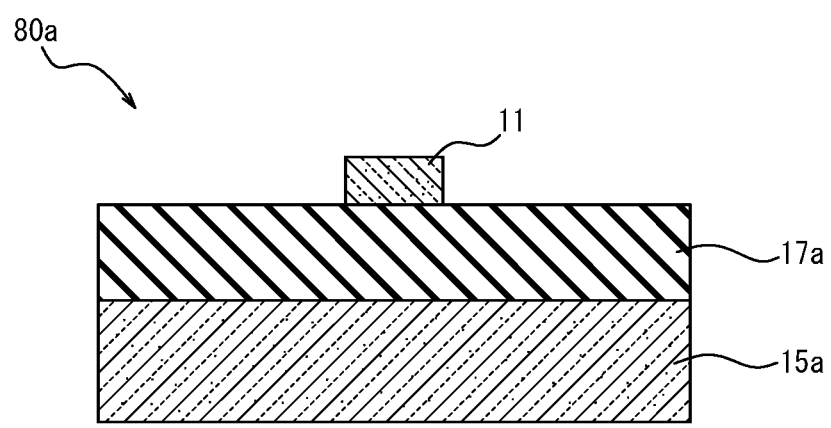
FIG. 22 is a cross-sectional end view of the optical waveguide main portion 80a of FIG. 19 along the J-J line.
Figure 23:
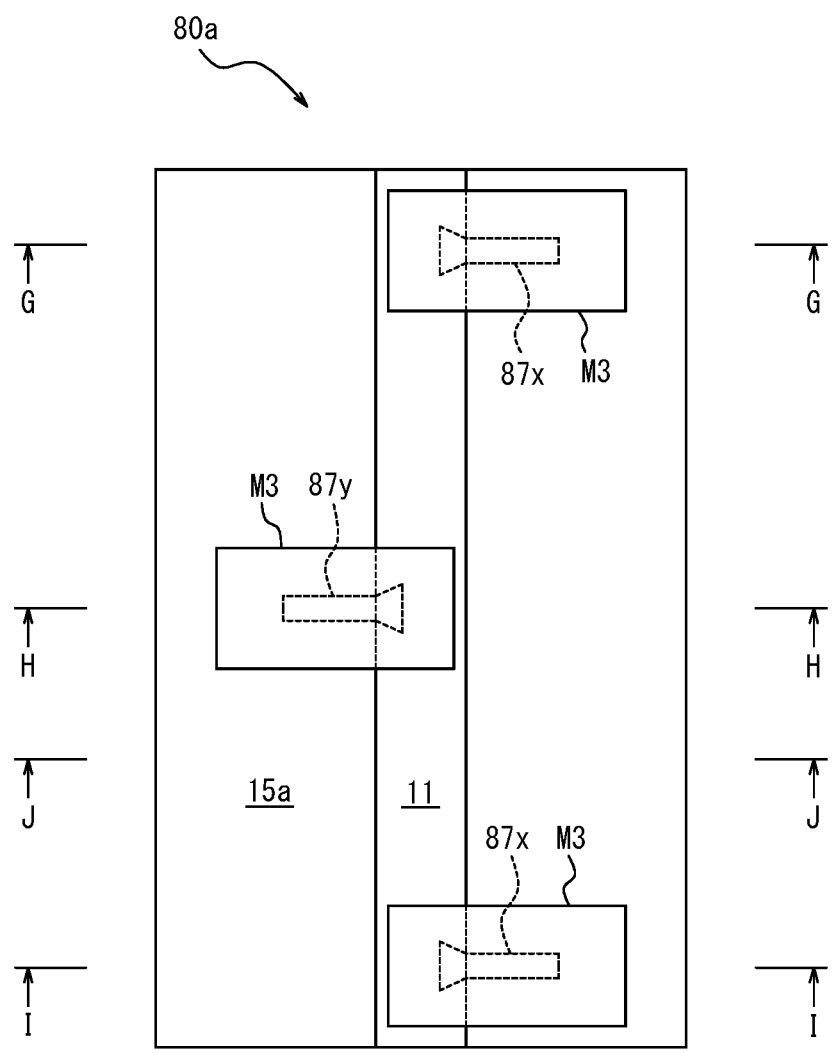
FIG. 23 is a plan view of the optical waveguide main portion 80a, with a portion of a BOX layer 17a removed, to illustrate the method of manufacturing the optical waveguide 80 according to the fourth embodiment of the present disclosure.
Figure 24:
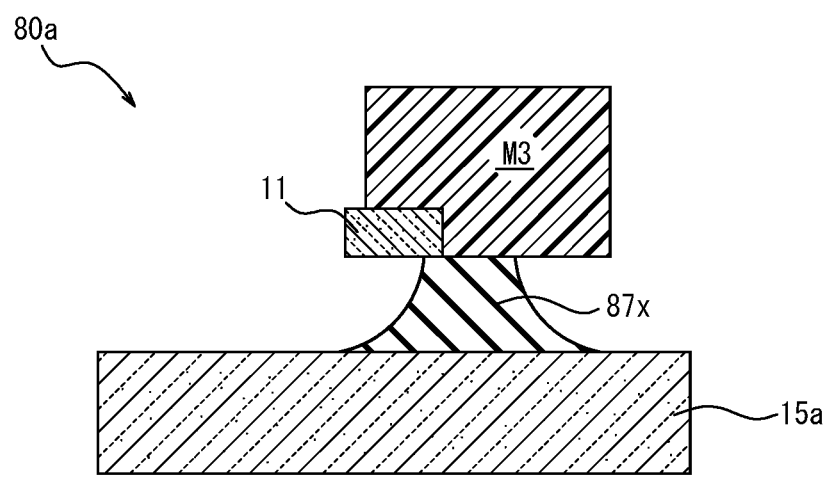
FIG. 24 is a cross-sectional end view of the optical waveguide main portion 80a of FIG. 23 along the G-G line and I-I line.
Figure 25:
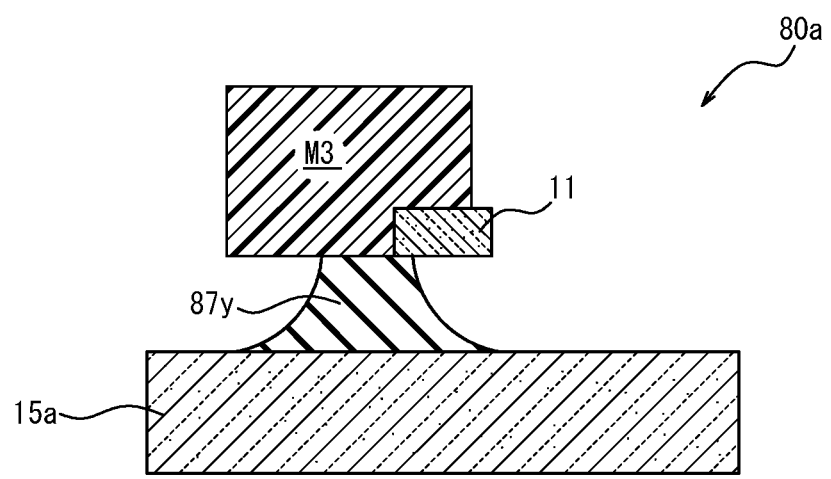
FIG. 25 is a cross-sectional end view of the optical waveguide main portion 80a of FIG. 23 along the H-H line.
Figure 26:
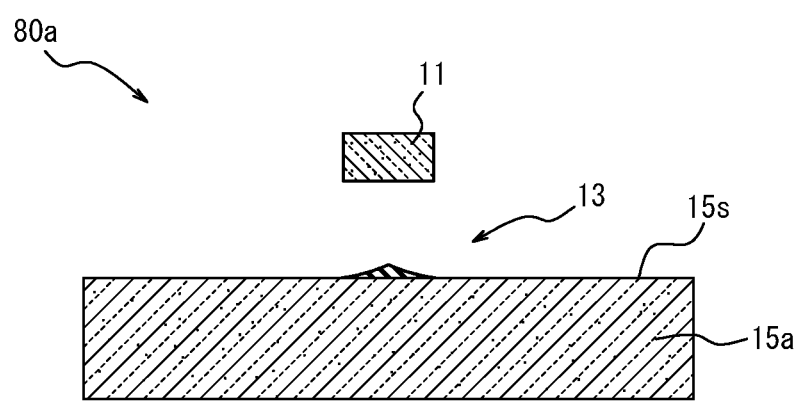
FIG. 26 is a cross-sectional end view of the optical waveguide main portion 80a of FIG. 23 along the J-J line.

Next, a method of manufacturing the optical waveguide 80 according to the fourth embodiment is described using FIGS. 15 through 26, with reference to FIGS. 11, 12, and 13. FIG. 15 is a manufacturing process plan view of the optical waveguide 80. FIG. 16 is a manufacturing process end view of the optical waveguide 80 along the G-G line, the I-I line, the H-H line, and the J-J line in FIG. 15. FIG. 17 is a manufacturing process plan view of the optical waveguide 80. FIG. 18 is a manufacturing process end view of the optical waveguide 80 along the G-G line, the I-I line, the H-H line, and the J-J line in FIG. 17. FIG. 19 is a manufacturing process plan view of the optical waveguide 80. FIG. 20 is a manufacturing process end view of the optical waveguide 80 along the G-G line and the I-I line in FIG. 19. FIG. 21 is a manufacturing process end view of the optical waveguide 80 along the H-H line in FIG. 19. FIG. 22 is a manufacturing process end view of the optical waveguide 80 along the J-J line in FIG. 19. FIG. 23 is a manufacturing process plan view of the optical waveguide 80. FIG. 24 is a manufacturing process end view of the optical waveguide 80 along the G-G line and the I-I line in FIG. 23. FIG. 25 is a manufacturing process end view of the optical waveguide 80 along the H-H line in FIG. 23. FIG. 26 is a manufacturing process end view of the optical waveguide 80 along the J-J line in FIG. 23.

First, an $SiO_2$ film is formed on either or both of the support substrate 15a, which is formed from silicon and ultimately becomes the substrate 15, and an active substrate 11a, which is formed from silicon and from which the core layer 11 is formed. The support substrate 15a and the active substrate 11a are then stuck together, with the $SiO_2$ film therebetween, and thermally treated to be joined. The active substrate 11a is then ground, polished, or the like to a predetermined thickness to adjust the film thickness of the active substrate 11a. Consequently, as illustrated in FIGS. 15, 16, an SOI substrate 100 is formed to have a "silicon-insulating layer-silicon" structure that includes the support substrate 15a, a BOX layer 17a formed on the support substrate 15a, and the active substrate 11a formed on the BOX layer 17a.

Next, lithography and etching are used on the SOI substrate 100 to etch the active substrate 11a and form a core layer 11 in the shape of a rectangular parallelepiped. Consequently, as illustrated in FIGS. 17, 18, an optical waveguide main portion 80a is formed to include the plate-shaped support substrate 15a, the plate-shaped BOX layer 17a formed on the support substrate 15a, and the core layer 11 formed as a rectangular prism on a portion of the BOX layer 17a.

Next, as illustrated in FIGS. 19 to 21, a mask layer M3 covering a portion of the core layer 11 and the BOX layer 17a is formed. The mask layer M3 is positioned towards one end from the widthwise center of the core layer 11 and is arranged to alternate discontinuously. As illustrated in FIG. 22, the core layer 11 and the BOX layer 17a are exposed, without being covered by the mask layer M3, in a portion in the longitudinal direction. The mask layer M3 may be a photoresist or a hard mask such as a silicon nitride film.

Next, a portion of the BOX layer 17a of the optical waveguide main portion 80a is removed by wet etching or the like, with the mask layer M3 as a mask. Consequently, as illustrated in FIGS. 23 to 26, the first support 87x and the second support 87y are formed to alternate discontinuously at positions towards both sides (the right in FIG. 24 and the left in FIG. 25) from the widthwise center of the core layer 11 (i.e. positions shifted in the width direction from the optical axis OA of the infrared light propagating through the core layer 11). This yields a structure in which a portion of the core layer 11 is separated from the substrate 15. In other words, the connecting portions 871, 872 of the first support 87x and the second support 87y connected to the core layer 11 are not located at positions, on the outer surface, that are the shortest distance from the center of the core layer 11 (the widthwise center of the outer surface when the core layer 11 is elongated widthwise as in FIGS. 24, 25) in a plane that is orthogonal to the longitudinal direction, i.e. the propagation direction of the infrared light, and that includes the first support 87x or the second support 87y. Rather, the connecting portions 871, 872 are each positioned towards one of the ends from the widthwise center of the core layer 11 and are formed to alternate discontinuously along the propagation direction of the infrared light. The space 13 is formed between the center of the core layer 11 and a principal surface 15s of the substrate 15.

Subsequently, the mask layer M3 is etched. While formation of the grating couplers is omitted in the fourth embodiment, grating couplers 118, 119 such as the ones in FIG. 11 may be formed at the same time as, or before or after, formation of the core layer 11 illustrated in FIG. 17. The mask layer M3 illustrated in FIG. 19 may then be formed. Formation of the slit-shaped grating coupler 118 at one end in the longitudinal direction of the core layer 11 and the slit-shaped grating coupler 119 at the other end in the longitudinal direction of the core layer 11 yields the structure in FIG. 11.

Next, the support substrate 15a is cut in a predetermined region to separate the optical waveguide main portion 80a. This completes the optical waveguide 80 (see FIGS. 11, 12, 13, 14), in which the first support 87x and the second support 87y alternate discontinuously at positions shifted, in the width direction of the core layer 11, from the optical axis OA of the infrared light propagating through the core layer 11.

Furthermore, as illustrated in FIG. 11, the light source 20 is installed to be capable of emitting the infrared light IR onto the grating coupler 118 of the optical waveguide 80, and the light detector 40 is disposed to be capable of detecting the infrared light IR emitted from the grating coupler 119 of the optical waveguide 10, thereby completing the optical concentration measuring apparatus 8.

The optical waveguide 80 thus has a structure in which the first support 87x and the second support 87y that support the core layer 11 are shifted from a position on the outer surface overlapping the center in a cross-section perpendicular to the longitudinal direction of the core layer 11 (where the distance from the optical axis OA of light propagating through the core layer 11 is shortest) to be located respectively at each side of the widthwise center of the core layer 11. This structure can prevent a decrease, due to the first support 87x and the second support 87y, in the detection characteristics of the substance to be measured MO while also increasing the mechanical strength.

Figure 27:
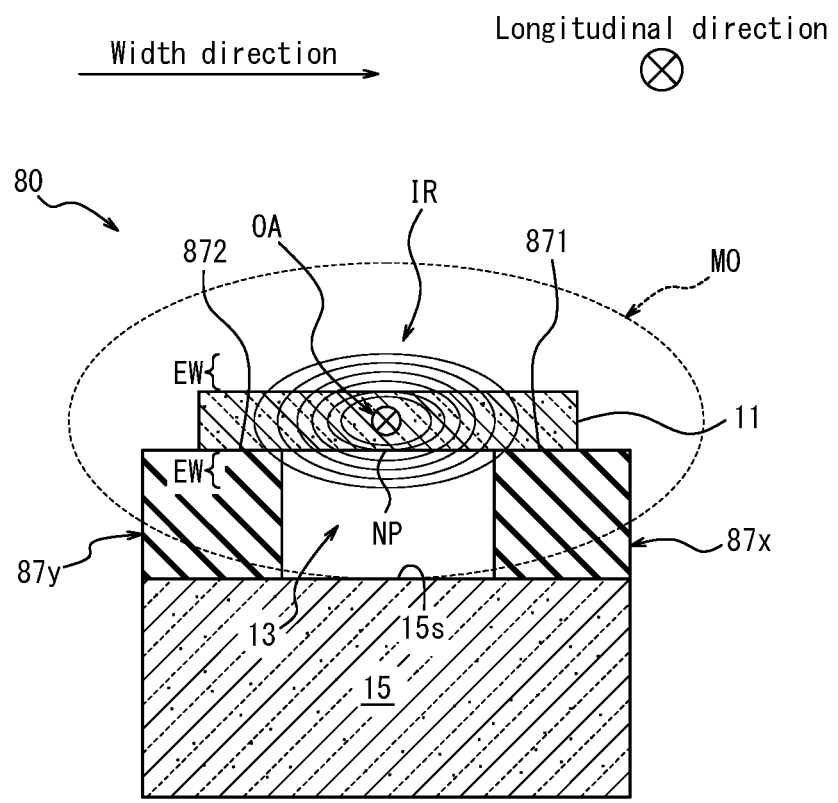
FIG. 27 is an end view illustrating the schematic configuration of an optical waveguide 80 according to a modification to the fourth embodiment of the present disclosure.

In the fourth embodiment, the first support 87x and the second support 87y are formed in different cross-sections in the direction perpendicular to the longitudinal direction of the core layer 11. Similar effects, however, are obtained when the supports are formed in the same cross-section in the direction perpendicular to the longitudinal direction of the core layer 11, as illustrated in FIG. 27.

As described above, the fourth embodiment can provide the optical waveguide 80 and the optical concentration measuring apparatus 8 that have the first support 87x and the second support 87y for supporting the core layer 11 without reducing the sensitivity of a sensor.

Furthermore, the optical waveguide 80 according to the fourth embodiment can increase the amount of interaction between the evanescent wave EW of light propagating through the core layer 11 and the substance to be measured MO and can reduce the amount of the evanescent wave EW that is absorbed by the first support 87x and the second support 87y. The optical waveguide 80 according to the fourth embodiment can thereby stably detect the substance to be measured MO, in a variety of modes of use, with high sensitivity.

FIFTH EMBODIMENT

An optical waveguide and an optical concentration measuring apparatus according to the fifth embodiment of the present disclosure are described with reference to FIG. 28 through FIG. 34.

An optical waveguide 90 according to the fifth embodiment is described as using silicon for the core material, but the core material is not limited to silicon and may be any material that functions as an optical waveguide, such as GaAs.

Figure 28:
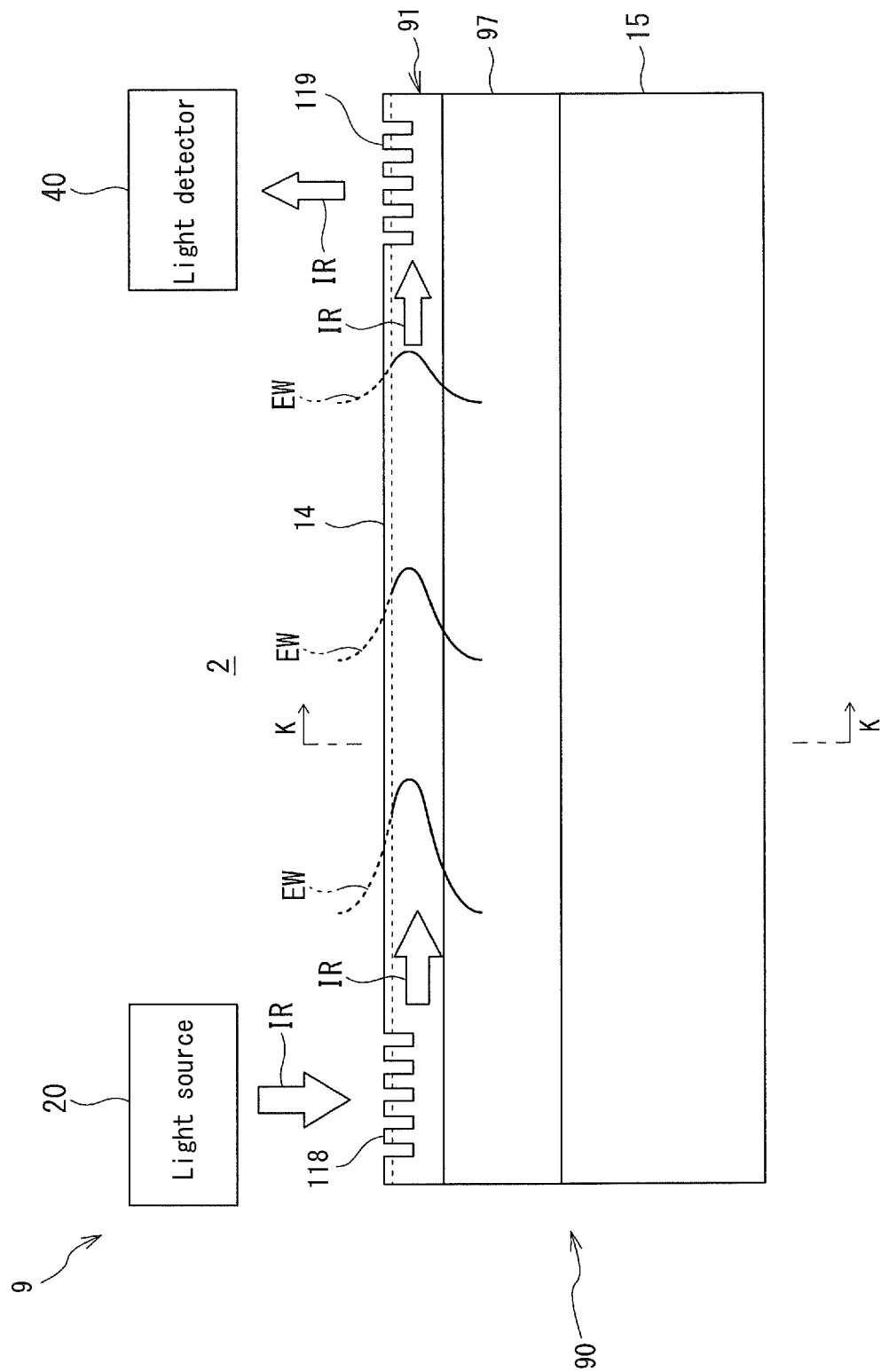
FIG. 28 illustrates a schematic configuration of an optical waveguide 90 and an optical concentration measuring apparatus 9 according to a fifth embodiment of the present disclosure and illustrates sensing by the ATR method using the optical concentration measuring apparatus 9.
Figure 29:
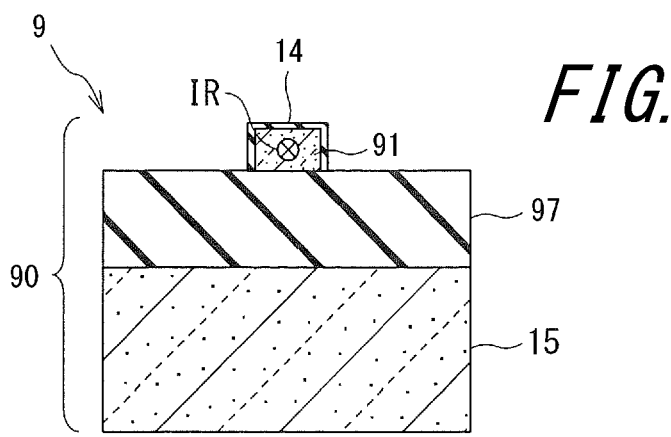
FIG. 29 is a cross-sectional end view of the optical waveguide 90 and the optical concentration measuring apparatus 9, along the K-K line in FIG. 28, illustrating the schematic configuration of the optical waveguide 90 and the optical concentration measuring apparatus 9 according to the fifth embodiment of the present disclosure.

FIG. 28 and FIG. 29 illustrate the schematic configuration of an optical concentration measuring apparatus 9 according to the fifth embodiment and are also conceptual drawings of the ATR method using the optical waveguide 90 according to the fifth embodiment.

As illustrated in FIG. 28, the optical concentration measuring apparatus 9 is installed and used in an exterior space 2 containing a gas whose concentration or the like is to be detected. The optical concentration measuring apparatus 9 includes the optical waveguide 90 according to the fifth embodiment, a light source 20 capable of causing light (infrared light IR in the fifth embodiment) to enter a core layer 91 provided in the optical waveguide 90, and a light detector (an example of a detector) 40 capable of detecting the infrared light IR that has propagated through the core layer 91.

The optical waveguide 90 includes the core layer 91, through which the infrared light IR (an example of light) can propagate in the longitudinal direction (the left-right direction in FIG. 28), and a protective film 14 (details provided below) formed on at least a portion of the surface of the core layer 91. The optical waveguide 90 includes a substrate 15, a cladding layer (an example of a support) 97 formed on the substrate 15, and the core layer 91 formed on the cladding layer 97. The cladding layer 97 joins the substrate 15 and the core layer 91. The core layer 91 and the substrate 15 are formed from silicon (Si), and the cladding layer 97 is formed from silicon dioxide ($SiO_2$).

The substrate 15 and the cladding layer 97 are plate-shaped. The core layer 91 is a rectangular parallelepiped. The optical waveguide 90 includes a grating coupler 118 formed at one end of the core layer 91 in the longitudinal direction and a grating coupler 119 formed at the other end of the core layer 91 in the longitudinal direction. The grating coupler 118 is disposed below the light source 20. The grating coupler 118 couples the infrared light IR incident from the light source 20 with the infrared light IR propagating through the core layer 91. The grating coupler 119 is disposed below the light detector 40. The grating coupler 119 extracts the infrared light IR propagating through the core layer 91 and emits the infrared light IR towards the light detector 40.

FIG. 29 is a cross-section of the optical concentration measuring apparatus along the K-K line in FIG. 28. As illustrated in FIG. 29, the optical waveguide 90 according to the fifth embodiment includes a core layer 91, through which light (infrared light in the fifth embodiment) propagates in the longitudinal direction, and the protective film 14 formed between the core layer 91 and a substance to be detected present in the exterior space 2. In a cross-section of at least a portion perpendicular to the longitudinal direction of the core layer (a cross-section along the K-K line, i.e. the cross-section in FIG. 29), the entire surface of the core layer is not exposed. In the fifth embodiment, the core layer 91 is formed from silicon. The protective film 14 is provided to suppress natural oxidation of the surface of the core layer 91. The protective film 14 is preferably provided in such a way that the surface of the core layer 91 is not exposed. The protective film 14 may therefore be formed from any material that can suppress natural oxidation of the surface of the core layer 91. When, for example, the core layer 91 is formed from silicon, the protective film 14 may be formed as a silicon nitride film, a silicon oxynitride film, or a laminate of a silicon oxide film and a silicon nitride film. A film including nitrogen has the effect of suppressing oxidation of the surface of the core layer 91. As the nitrogen content is higher, the effect of suppressing oxidation increases. The protective film 14 may be a film that includes nitrogen and has a nitrogen content of 1% or more in at least a partial region of the film. A silicon nitride film and a silicon oxynitride film have a high refractive index difference with respect to silicon and are therefore excellent materials for forming a cladding layer. Furthermore, a silicon nitride film and a silicon oxynitride film exhibit little absorption of infrared light and can therefore minimize a reduction in the detection sensitivity of the material to be measured due to formation of the protective film 14 on the surface of the core layer 91.

The protective film 14 is preferably thin, as long as the thickness is sufficient to suppress natural oxidation of the core layer 91. The reason is that the region of interaction between the evanescent wave and the substance to be measured can be expanded as the protective film 14 is thinner. If the protective film 14 is formed to be too thick, then although degradation in the characteristics of the optical waveguide 90 can be prevented, the amount of interaction between the evanescent wave and the substance to be measured decreases. This decreases the sensitivity that the optical concentration measuring apparatus 9 is intended to have as a detection apparatus. Accordingly, the thickness of the protective film 14 may be 1 nm or more and less than 20 nm, or may be 2 nm or more and less than 5 nm. The lower limit of 1 nm on the thickness of the protective film 14 represents the thickness roughly necessary for stopping growth of a natural oxide film on the surface of the core layer 91. The upper limit of 20 nm on the thickness of the protective film 14 takes into consideration the change, depending on the material for forming the protective film 14 and the formation method, in the effect of suppressing natural oxide film growth.

Next, operations of the optical waveguide 90 and the optical concentration measuring apparatus 9 are described with reference to FIG. 28. The optical concentration measuring apparatus 9 detects a gas in the exterior space 2 using the ATR method. In the ATR method, infrared light is guided into an optical waveguide from one grating coupler, is propagated through the optical waveguide, and is extracted at the side of another grating coupler. The amount of the infrared light is then detected by a light detector located ahead.

In greater detail, infrared light IR emitted from the light source 20 is incident on the grating coupler 118 provided in the optical waveguide 190, as illustrated in FIG. 28. The incident infrared light IR is diffracted and guided into the core layer 91 at a predetermined angle by the grating coupler 118 to be coupled with the infrared light IR propagating through the core layer 91.

The infrared light IR guided through the core layer 91 is repeatedly reflected at the boundary between the core layer 91 and the protective film 14, and at the boundary between the core layer 91 and the cladding layer 97, and arrives at the grating coupler 119. An evanescent wave EW is produced in the exterior space 2 via the protective film 14 when the infrared light IR is reflected at the boundary between the core layer 91 and the protective film 14. The amount of the evanescent wave EW extending into the exterior space 2 (the extension depth) differs in accordance with the substance to be detected present in the exterior space 2, and the amount of the evanescent wave EW that is absorbed also differs in accordance with the substance to be detected present in the exterior space 2. Therefore, the intensity of the infrared light IR that propagates through the core layer 91 and arrives at the grating coupler 119 differs in accordance with the substance to be detected present in the exterior space 2.

The grating coupler 119 diffracts the arriving infrared light IR and extracts the infrared light IR into the exterior space 2 towards the light detector 40. The concentration or the like of the substance to be detected present in the exterior space 2 can be detected by analyzing the intensity of the infrared light IR detected by the light detector 40.

Figure 30:
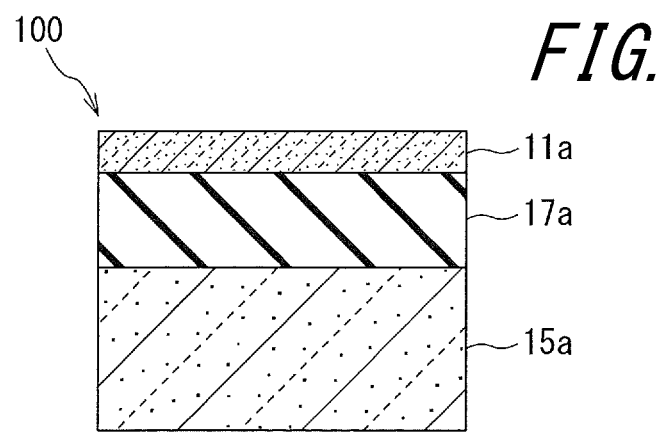
FIG. 30 is a manufacturing process end view (part 1) illustrating a method of manufacturing the optical waveguide 90 and the optical concentration measuring apparatus 9 according to the fifth embodiment of the present disclosure.
Figure 31:
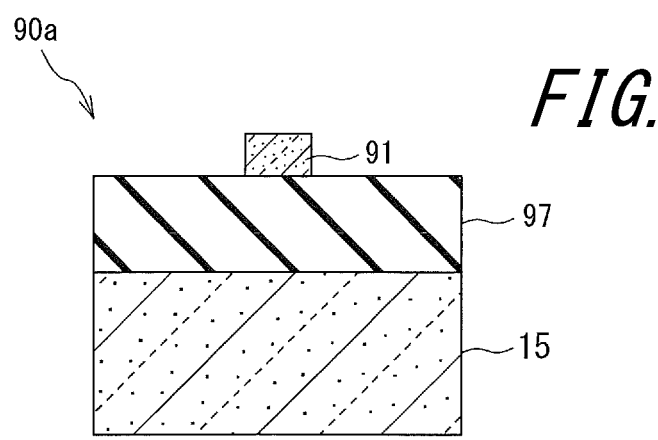
FIG. 31 is a manufacturing process end view (part 2) illustrating the method of manufacturing the optical waveguide 90 and the optical concentration measuring apparatus 9 according to the fifth embodiment of the present disclosure.

Next, a method of manufacturing the optical waveguide 90 is described using FIGS. 30 and 31, with reference to FIGS. 28 and 29. FIG. 30 is a manufacturing process end view of the optical waveguide 90 along the K-K line in FIG. 1.

First, an $SiO_2$ film is formed on either or both of the support substrate 15a, which is formed from silicon and ultimately becomes the substrate 15, and an active substrate 91a, which is formed from silicon and from which the core layer 11 is formed. The support substrate 15a and the active substrate 11a are then stuck together, with the $SiO_2$ film therebetween, and thermally treated to be joined. The active substrate 11a is then ground, polished, or the like to a predetermined thickness to adjust the film thickness of the active substrate 11a. Consequently, as illustrated in FIG. 30, an SOI substrate 100 is formed to have a "silicon-insulating layer-silicon" structure that includes the support substrate 15a, a BOX layer 17a formed on the support substrate 15a, and the active substrate 11a formed on the BOX layer 17a.

Next, lithography and etching are used on the SOI substrate 100 to etch the active substrate 11a and form a core layer 91 in the shape of a rectangular parallelepiped. Consequently, as illustrated in FIG. 31, an optical waveguide main portion 90a is formed to include the plate-shaped substrate 15, the plate-shaped cladding layer 97 formed on the substrate 15, and the core layer 91 formed as a rectangular prism on a portion of the cladding layer 97.

Subsequently, a nitride film is deposited using thermal CVD, or oxidation is performed under an atmosphere including NO or $N_2O$, to form a film including nitrogen on the surface of the core layer 91. This nitride film is formed to a thickness of 1 nm or more and less than 20 nm, for example. In this way, the protective film 14 is formed on the three sides of the core layer 91 other than the side in contact with the cladding layer 97, as illustrated in FIG. 29.

When using deposition by thermal CVD in the method of forming a film including nitrogen, a film including nitrogen is also formed on the surface of the cladding layer 97. On the other hand, when using oxidation under an atmosphere including NO or $N_2O$, a film including nitrogen is not formed on the surface of the cladding layer 97. Among these formation methods, oxidation under an atmosphere including NO or $N_2O$ is adopted in the fifth embodiment to form the protective film 14 including nitrogen on the surface of the core layer 91.

Figure 32:
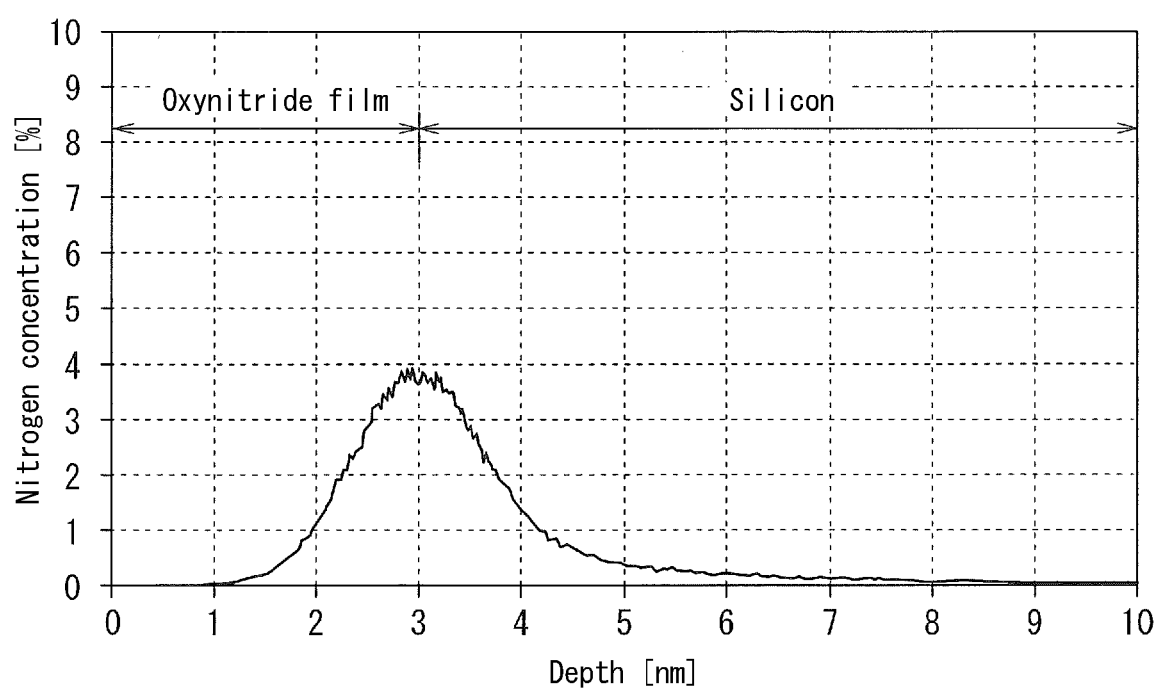
FIG. 32 illustrates the optical waveguide 90 and the optical concentration measuring apparatus 9 according to the fifth embodiment of the present disclosure, illustrating a nitrogen concentration distribution when silicon is oxidized under an atmosphere including NO.

As an example, FIG. 32 is a graph illustrating the nitrogen concentration when the silicon surface is oxidized under an atmosphere including NO to form an oxynitride film with a thickness of 3 nm. The horizontal axis in the graph in FIG. 32 represents depth (nm) from the surface of the oxynitride film, and the vertical axis of the graph represents the nitrogen concentration (%) in the oxynitride film and the silicon. The distribution in FIG. 32 indicates a nitrogen concentration of several percent near the boundary between the silicon and the oxynitride film. The nitrogen concentration in the oxynitride film can be adjusted by changing the NO gas flow rate during oxidation.

Furthermore, the slit-shaped grating coupler 118 is subsequently formed at one end in the longitudinal direction of the core layer 91, and the slit-shaped grating coupler 119 is formed at the other end in the longitudinal direction of the core layer 91. As illustrated in FIG. 28, this completes the optical waveguide 90 having the protective film 14, which includes nitrogen and has a thickness of 1 nm or more and less than 20 nm, on the surface of the core layer 91. The order of the process to form the grating couplers and the process to form the film including nitrogen on the surface of the core layer 91 may be reversed.

Furthermore, while omitted from the drawings, the light source 20 is installed to be capable of emitting the infrared light IR onto the grating coupler 118 of the optical waveguide 90, and the light detector 40 is disposed to be capable of detecting the infrared light IR emitted from the grating coupler 119 of the optical waveguide 90, thereby completing the optical concentration measuring apparatus 9.

Figure 33:
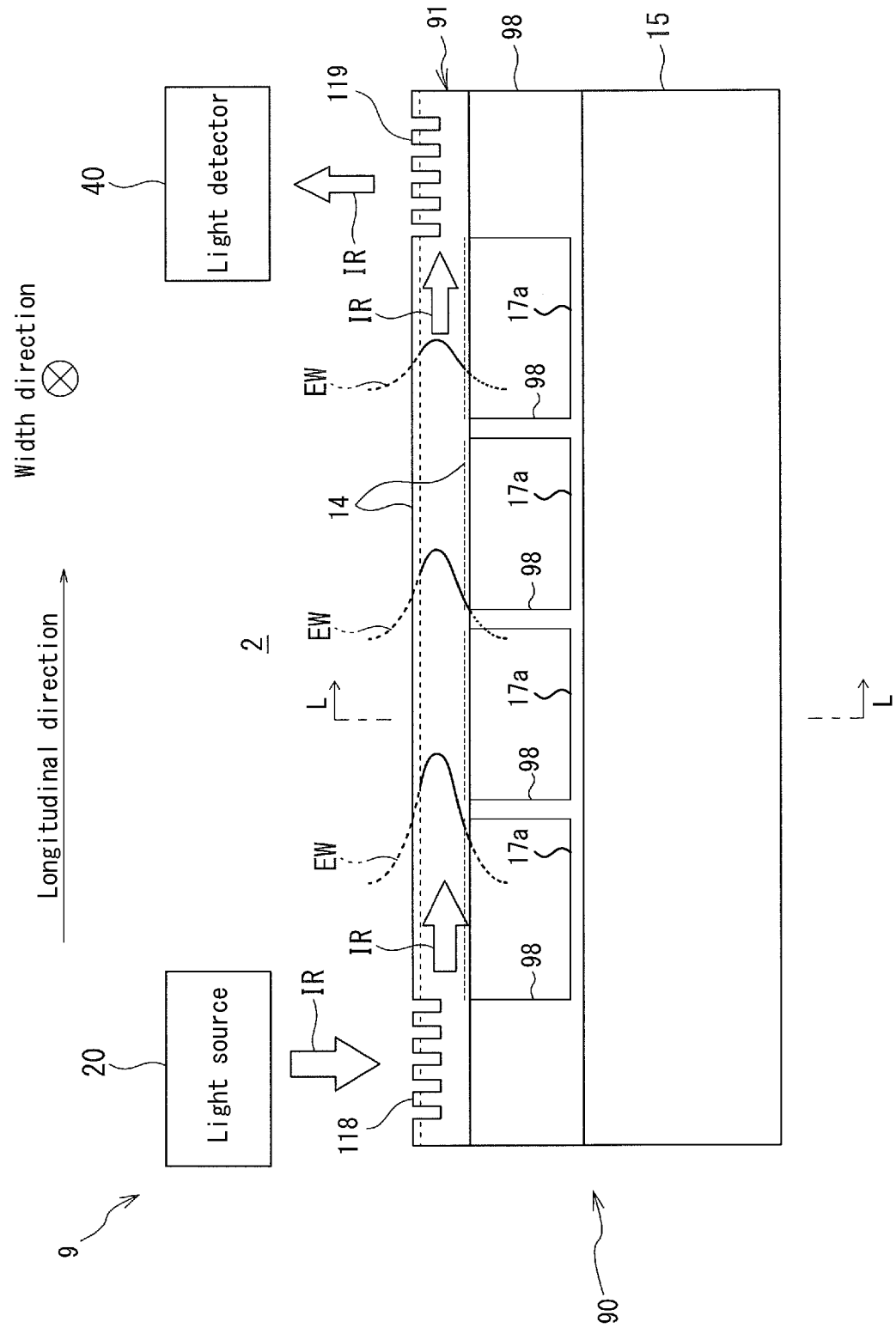
FIG. 33 illustrates another schematic configuration of the optical waveguide 90 and the optical concentration measuring apparatus 9 according to the fifth embodiment of the present disclosure and illustrates sensing by the ATR method using the optical concentration measuring apparatus 9.
Figure 34:
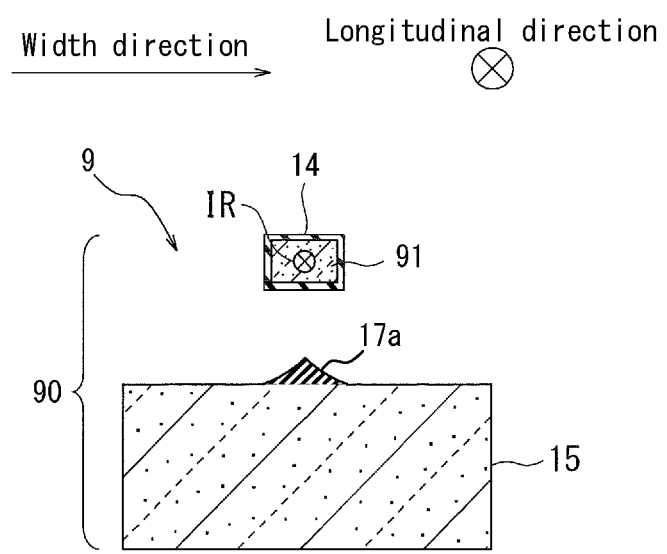
FIG. 34 is a cross-sectional end view of the optical waveguide 90 and the optical concentration measuring apparatus 9, along the L-L line in FIG. 33, illustrating another schematic configuration of the optical waveguide 90 and the optical concentration measuring apparatus 9 according to the fifth embodiment of the present disclosure.

Next, another example configuration of the optical waveguide 90 and the optical concentration measuring apparatus 9 is described using FIGS. 33 and 34. FIGS. 33 and 34 illustrate the optical waveguide 90 and the optical concentration measuring apparatus 9 according to another example configuration. FIG. 34 is a cross-section of the optical concentration measuring apparatus 9 along the L-L line in FIG. 33.

As illustrated in FIG. 33, the optical waveguide 90 according to the other example configuration has a floating core layer 91 in which supports 98 for supporting the core layer 91 are only present in certain portions. Specifically, the core layer 91 is supported by a plurality of columnar supports 98 formed at predetermined intervals on the substrate 15.

When forming the optical waveguide 90 to include the floating core layer 91, an additional process is performed after the core layer 91 is formed as a rectangular prism on the BOX layer 17a in FIG. 30 (i.e. in a state corresponding to FIG. 31). Specifically, lithography, wet etching, or the like is used to partially remove the BOX layer 17a except in a region where the core layer 91 is to be supported by the supports 98. A plurality of supports 98 are thus formed in portions between the core layer 91 and the substrate 15. In this way, the core layer 91 can be floated by the supports 98, yielding a space in portions between the core layer 91 and the substrate 15. In the optical waveguide 90 according to the other example configuration, the air in the space between the core layer 91 and the substrate 15 functions as a cladding layer. The optical waveguide 90 according to the other example configuration may also have a structure such that adjacent supports 98 are connected by the BOX layer 17a remaining on the substrate 15 after etching, as illustrated in FIGS. 33 and 34.

After formation of the supports 98, a nitride film is deposited using thermal CVD, or oxidation is performed under an atmosphere including NO or $N_2O$, to form a film including nitrogen on the surface of the core layer 91. The protective film 14 can thus be formed around the entire surface of the core layer 91 in a cross-section perpendicular to the longitudinal direction of the core layer 91, as illustrated in FIG. 34, and deterioration of the core layer 91 can effectively be suppressed. The optical waveguide 90 and optical concentration measuring apparatus 9 including the floating core layer 91 illustrated in FIG. 33 are completed by a manufacturing process similar to the one described above being performed after formation of the protective film 14. A detailed explanation is omitted.

Figure 35:
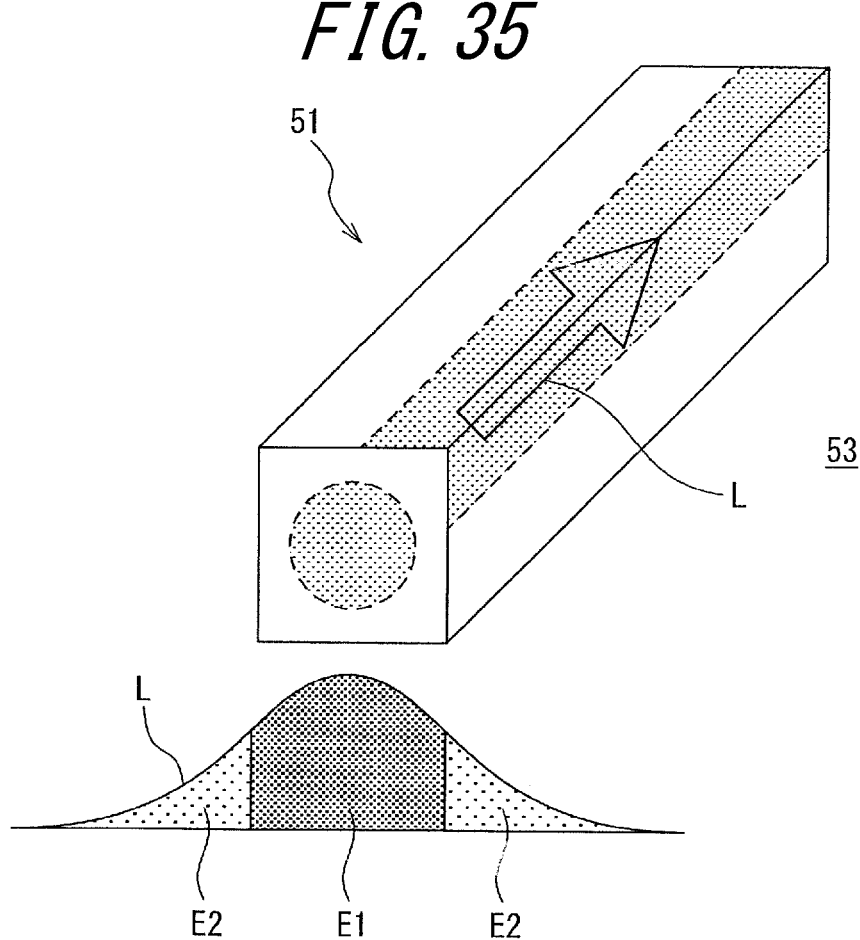
FIG. 35 illustrates an evanescent wave of light propagating through an optical waveguide.

Here, the effects of the optical waveguide 90 and the optical concentration measuring apparatus 9 according to the fifth embodiment (including the optical waveguide 90 and the optical concentration measuring apparatus 9 according to the other configuration example) are described. In a sensor using the ATR method, greater exposure of the surface of the core layer forming the optical waveguide increases the amount of the evanescent wave that interacts with the substance to be detected. This improves the sensitivity of the sensor. If the core layer is exposed, however, the surface state of the core layer changes unexpectedly due to the external environment, and the sensor performance ends up changing over time. Natural oxidation is one example of change in the core layer due to the external environment. As illustrated in FIG. 35, the evanescent wave is greatest at the boundary between a structure 51 (corresponding to the core layer in the case of an optical waveguide) and an external substance 53. The intensity E2 of the evanescent wave decreases as the distance from this boundary increases. The sensitivity of the sensor is therefore more easily affected as the state changes in a region closer to the boundary between the structure 51 and the substance 53. Accordingly, the effect of the natural oxide film occurring on the outermost surface of the structure 51 is disastrous for a sensor required to have high sensitivity.

By contrast, the optical waveguide 90 includes the protective film 14 on the surface of the core layer 91. The optical waveguide 90 is therefore configured so that the core layer 91 does not come into direct contact with the exterior space 2. This allows the surface state of the core layer 91 to be maintained in the initial state, without changing over time. Consequently, the optical waveguide 90 and the optical concentration measuring apparatus 9 can prevent age-related degradation. Furthermore, the protective film 14 is formed as a silicon nitride film or silicon oxynitride film that absorbs little infrared light and has a thickness of 1 nm or more and less than 20 nm. The optical waveguide 90 can thus prevent a reduction in the amount of interaction between the evanescent wave and the substance to be detected. Consequently, the optical waveguide 90 and the optical concentration measuring apparatus 9 can detect the substance to be detected with high sensitivity.

As described above, the optical waveguide and optical concentration measuring apparatus according to the fifth embodiment (including the optical waveguide and the optical concentration measuring apparatus according to the other configuration example) include the protective film on the surface of the core layer and can therefore prevent degradation of the surface state of the core layer due to the external environment. Consequently, the optical waveguide and the optical concentration measuring apparatus according to the fifth embodiment can detect the substance to be detected with high sensitivity and can prevent age-related degradation.

Embodiments of the present disclosure have been described, but the technical range of the present disclosure is not limited to the technical range of the above embodiments. A variety of modifications or improvements may be made to the above embodiments, and it is clear from the scope of the patent claims that embodiments with such modifications or improvements can be included within the technical range of the present disclosure.

REFERENCE SIGNS LIST 1, 8, 9 Optical concentration measuring apparatus
2 Exterior space
10, 60, 70, 80, 90, 10' Optical waveguide
10a, 70a, 80a, 90a Optical waveguide main portion
11, 91, 11' Core layer
11a Active substrate
13, 13a, 13b, 13c Space
14 Protective film
15, 15' Substrate
15a Support substrate
15s Principal surface
17, 17x, 17y, 97, 98, 17' Support (cladding layer)
87x, 87y First support, second support
17a BOX layer
20 Light source
40 Light detector
51 Structure
53 Substance
100 SOI substrate
111, 112, 113 Separated portion
118, 119 Grating coupler
171, 172, 173 Connecting portion
871, 872 Connecting portion of first support, connecting portion of second support a1 Axis where optical axis OA1 will be formed
a2 Axis where optical axis OA2 will be formed
a3 Axis where optical axis OA3 will be formed
Cm Center line of mask layer
OA, OA1, OA2, OA3 Optical axis
EW Evanescent wave
IR Infrared light
L Light
MO Substance to be measured
M1, M2, M3 Mask layer
NP Position having shortest distance from the center to the outer surface

The invention claimed is:

1. An optical waveguide for use in an optical concentration measuring apparatus for measuring concentration of a gas to be measured or a liquid to be measured, the optical waveguide comprising:
a substrate;
a core layer that extends along a longitudinal direction and through which light can propagate; and
a support formed from a material with a smaller refractive index than the core layer and configured to connect at least a portion of the substrate and at least a portion of the core layer to support the core layer with respect to the substrate;
wherein a connecting portion of the support connected to the core layer is shifted from a position having a shortest distance from a center to an outer surface in a cross-section perpendicular to the longitudinal direction of the core layer.

2. The optical waveguide of claim 1, wherein at least a portion of the core layer is provided in a manner allowing contact with the gas to be measured or the liquid to be measured.

3. An optical waveguide comprising:
a substrate;
a core layer that extends along a longitudinal direction and through which light can propagate; and
a support formed from a material with a smaller refractive index than the core layer and configured to connect at least a portion of the substrate and at least a portion of the core layer to support the core layer with respect to the substrate;
wherein at least a portion of the core layer is provided in a manner allowing contact with a gas or a liquid; and
wherein a connecting portion of the support connected to the core layer is shifted from a position having a shortest distance from a center to an outer surface in a cross-section perpendicular to the longitudinal direction of the core layer.

4. The optical waveguide of claim 1, wherein the support comprises a plurality of the connecting portions separated spatially.

5. The optical waveguide of claim 1, wherein at least a portion of the core layer is floating without being joined to the support.

6. The optical waveguide of claim 1, wherein the core layer comprises a protective film formed on at least a portion of a surface of the core layer and having a thickness of 1 nm or more and less than 20 nm.

7. The optical waveguide of claim 6, wherein the protective film is a silicon nitride film or a silicon oxynitride film.

8. The optical waveguide of claim 1, wherein light propagating through the core layer is infrared light serving as an analog signal.

9. The optical waveguide of claim 1,
wherein the support comprises a first support and a second support; and
wherein in a width direction of the core layer, a connecting portion of the first support is positioned between a center and one end, and a connecting portion of the second support is positioned between the center and the other end.

10. The optical waveguide of claim 9, wherein the connecting portion of the first support and the connecting portion of the second support are intermittently present along the longitudinal direction.

11. The optical waveguide of claim 9, wherein the connecting portion of the first support and the connecting portion of the second support are alternately present along the longitudinal direction.

12. The optical waveguide of claim 9, wherein at least a portion of the core layer is exposed or is covered by a thin film.

13. The optical waveguide of claim 9, wherein the first support and the second support are not present in an entire region between the core layer and the substrate in a cross-section perpendicular to the longitudinal direction at a position of at least a portion in the longitudinal direction of the core layer.

14. The optical waveguide of claim 9, wherein the connecting portion of the first support and the second support is shaped to expand in the longitudinal direction of the core layer with proximity to the center of the core layer from an edge of the core layer in the width direction of the core layer.

15. An optical concentration measuring apparatus comprising:
the optical waveguide of claim 1;
a light source capable of causing light to enter the core layer; and
a detector capable of detecting light that has propagated through the core layer.

16. The optical concentration measuring apparatus of claim 15, wherein the light source causes infrared light having a wavelength of 2 μm or more and less than 10 μm to enter the core layer.

* * * * *